US007761324B2

(12) United States Patent
Amerasinghe et al.

(10) Patent No.: US 7,761,324 B2
(45) Date of Patent: Jul. 20, 2010

(54) FORECASTING AND REVENUE MANAGEMENT SYSTEM

(75) Inventors: Prasanna Amerasinghe, Redwood Shores, CA (US); Alexander Goldstein, Foster City, CA (US); Brian Groves, San Francisco, CA (US); Michael Z. Li, San Francisco, CA (US); Yee Wah Lee, Redwood City, CA (US); Frank Yucheng Hu, Belmont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1180 days.

(21) Appl. No.: 10/008,254

(22) Filed: Nov. 9, 2001

(65) Prior Publication Data

US 2007/0208608 A1 Sep. 6, 2007

(51) Int. Cl.
*G06F 17/30* (2006.01)
(52) U.S. Cl. ...................................................... 705/10
(58) Field of Classification Search .................. 705/7, 705/10
See application file for complete search history.

(56) References Cited

U.S. PATENT DOCUMENTS

| 6,067,525 | A | | 5/2000 | Johnson et al. ............... 705/10 |
| 6,073,107 | A | * | 6/2000 | Minkiewicz et al. ........... 705/7 |
| 6,078,893 | A | * | 6/2000 | Ouimet et al. ................. 705/10 |
| 6,636,852 | B2 | | 10/2003 | Gozdeck et al. ................ 707/9 |
| 6,804,657 | B1 | * | 10/2004 | Sultan ........................... 705/10 |
| 6,920,464 | B2 | | 7/2005 | Fox ............................ 707/104.1 |
| 6,995,768 | B2 | | 2/2006 | Jou et al. ..................... 345/440 |
| 7,216,087 | B2 | | 5/2007 | Thompson et al. ............. 705/10 |
| 7,516,084 | B1 | | 4/2009 | Sankaran et al. ............... 705/10 |
| 2002/0099692 | A1 | * | 7/2002 | Shah et al. ...................... 707/2 |
| 2002/0107720 | A1 | * | 8/2002 | Martin .......................... 705/10 |
| 2002/0133444 | A1 | * | 9/2002 | Sankaran et al. .............. 705/36 |

FOREIGN PATENT DOCUMENTS

WO WO 00/67191 A2 * 11/2000

OTHER PUBLICATIONS

"S3/Diamond Multimedia Selects ChannelWave to Improve Sales Through Information Management", Business Wire, Apr. 5, 2000.*

* cited by examiner

*Primary Examiner*—Susanna M Diaz
(74) *Attorney, Agent, or Firm*—Campbell Stephenson LLP

(57) ABSTRACT

A system that enables users to generate and manage forecasts through an integrated software tool. Forecast administrators are enabled to create forecast series data that define a forecast's structure and provide search criteria that is used in generating forecasts. These data also define who may participate in creating forecasts, and their relative position in an organization's hierarchy. Users are also enabled to enter a variety of forecast data that are stored by the system. Various forecast data are then retrieved corresponding to the user, applicable subordinates, and parameters defined by the forecast series. Users may then fine-tune their forecasts and submit their forecasts to their managers. The managers are enabled to adjust and roll up their subordinate's forecasts to produce their own forecasts. This process may be recursively applied while moving up through various layers of management defined by the organization's hierarchy.

27 Claims, 33 Drawing Sheets

Forecast Series

| Name | Description | Frequency | Auto Fcst Filter | Manual Add Filter | Active | Mode |
|---|---|---|---|---|---|---|
| Booked Rev | Oppty Forecast | Month | [Revenue_Type] = "Booked" and ... | [Revenue_Type] = ... | √ | All |
| Billed Rev | Product Forecast | Month | [Revenue_Type] = "Billed" and ... | | √ | All Across Org's |
| Named Acts | Quarterly Fcst | Quarter | [Date] >= Fcst_Start_Dt and <= ... | [Date] >+ Fcst_Start_Dt ... | | Sales Rep |

*FIG. 4*

Forecast Series Dates

| Date | Start Period | End Period | Edit Period | View Period | Description |
|---|---|---|---|---|---|
| 1/1/99 | Jan 99 | December 99 | | | |
| 2/1/99 | Feb 99 | January 00 | | | |

*FIG. 5*

Forecast Participants

| Last Name | First Name | Position | Position Type | Region | Division | Department | Rolls Up To |
|---|---|---|---|---|---|---|---|
| Conway | Chris | Call Center Rep, NY | Outbound Rep | Western | Telesales | Telesales | Walter Davis |
| Alacon | Hector | Field Sales Rep, NJ | Field Sales Rep | Eastern | Field Sales | Telesales | Kim Beale |

Add Forecast Participants

| Last Name | First Name | Position | Position Type | Region | Division | Department | Parent Pos | Manager |
|---|---|---|---|---|---|---|---|---|
| Conway | Chris | Call Center Rep, NY | Outbound Rep | Western | Telesales | Telesales | Mgr, Tele | Walter Davis |
| Alacon | Hector | Field Sales Rep, NJ | Field Sales Rep | Eastern | Field Sales | Telesales | Mgr, Field | Kim Beale |

144  146

[Add]  [New]  [Close]

S_FCSTSER 86T

| Series | Start Date | End Date | Base Period | Interval | Interval Period Type |
|---|---|---|---|---|---|
| Series 1 | 1/1/2000 | 12/1/2000 | Month | 7 | Day |

S_FCSTSER_DATE (from Forecast Series Date View) 148T

| Forecast Date | Start Date | End Date | History View Date | History Edit Date |
|---|---|---|---|---|
| 1/1/2000 | 1/1/2000 | 1/31/2000 | 11/1/99 | 12/1/99 |
| 1/8/2000 | 1/1/2000 | 1/31/2000 | 11/1/99 | 12/1/99 |
| 1/15/2000 | 1/1/2000 | 1/31/2000 | 11/1/99 | 12/1/99 |
| 1/22/2000 | 1/1/2000 | 1/31/2000 | 11/1/99 | 12/1/99 |
| 1/29/2000 | 1/1/2000 | 1/31/2000 | 11/1/99 | 12/1/99 |
| 2/5/2000 | 2/1/2000 | 1/29/2000 | 11/1/99 | 12/1/99 |

S_FCSTSER_POSTN (from Forecast Series Participants View) 150IT

| Last Name | First Name | Position | Parent Position |
|---|---|---|---|
| Stevens | William | Sales Rep | Manager-West |
| Conway | Chris | Manager-West | Manager-US |
| Alacon | Hector | Manager-US | Vice President |

*FIG. 7*

ORGANIZATION HIERARCHY

FIG. 17

Account: A.K. Parker Inc., HQ
Address: 101 Main Street
San Mateo, CA 94402
USA
Source: ABC TV Ad

Opportunity: 275 Portables at A.K. Parker
Description: Great opportunity for our ...
Lead Quality: High
Methodology: Strategic Selling
Sales Stage: 03 – Qualification

Committed: ☐
Revenue: $850,000
Upside: $125,000
Close Date: 04/01/99
Probability: 50%

Opportunity Revenues

Show: Revenue ▼ — 252
By: Month ▼ — 254
Then: Product/Description ▼ — 256
— 258

Revenues

Jan  Feb  Mar  Apr
Months — 214A

☐ HP Laserjets
▨ 1 GB Hard
▩ Drive Services

— 212
— 210

Revenue Schedule Wizard – Step 1 of 4 – Date Range

| | | |
|---|---|---|
| Start Date: | 1/1/99 ▼ | ~264 |
| End Date: | 12/31/99 ▼ | ~266 |
| Frequency: | Month ▼ | ~268 |
| No. of Periods: | 12 ▼ | ~270 |

☑ Replace the existing revenue schedule items
~272

[ Cancel ] [ < Back ] [ Next > ] [ Finish ]

Revenue Schedule Wizard – Step 2 of 4 – Default Values

| | | |
|---|---|---|
| Account: | A.K. Parker Inc. ▼ | ~278 |
| Opportunity: | 275 Portables ▼ | ~280 |
| Contact: | ▼ | ~282 |
| Product: | 1 GB Hard Drives ▼ | ~284 |
| Product Line: | Hardware ▼ | ~286 |
| Revenue Class: | Upside ▼ | ~288 |
| Revenue Type: | Telecommunications ▼ | ~290 |

[ Cancel ] [ <Back ] [ Next > ] [ Finish ]

276　　　　　*FIG. 18B*　　　　　—292

Revenue Schedule Wizard – Step 3 of 4 - Patterns

Patterns: 296 ○ Quantity  298 ● Price  300 ○ Revenue

| Straight Line  302 | Increasing 10%  304 | Decreasing 5%  314 (TYP)  306 |
|---|---|---|
| Marginal Returns -10%  308 | Exponential 10%  310 | Stepped -10%  312 |

Select the appropriate revenue schedule patterns for Quantity, Price, and Revenue

[ Cancel ] [ <Back ] [ Next > ] [ Finish ]

Revenue Schedule Wizard – Step 4 of 4 – Amounts

Starting Quantity: [           ]
Starting Price:    [           ]  } 320
Starting Revenue:  [           ]

Average Price:  [ $250 ]
Total Quantity: [ 3000 ]        } 322
Total Revenue:  [ $600,000 ]
                                  324

[ Cancel ] [ <Back ] [ Next > ] [ Finish ]

318  *FIG. 18D*

Forecasts

| Series | Fcst Date | Status | Forecaster | Created By | Create Date | Submitted By | Submit Date | Revenue Amt |
|---|---|---|---|---|---|---|---|---|
| Billings | 02/01/99 | In Process | KBEALE | KBEALE | 02/01/99 | | | $1,000,000 |
| Billings | 01/01/99 | In Process | KBEALE | SADMIN | 01/01/99 | SADMIN | 1/1/99 | $1,300,000 |
| Bookings | 01/01/99 | In Process | KBEALE | SADMIN | 01/01/99 | SADMIN | 1/1/99 | $1,200,000 |
| Billings | 12/01/98 | Submitted | CCONWAY | CCONWAY | 12/01/98 | CCONWAY | 12/01/98 | $1,700,000 |
| Bookings | 12/01/98 | Submitted | CCONWAY | CCONWAY | 12/01/98 | CCONWAY | 12/01/98 | $1,500,000 |

— 410

| Series | Billings ▼ 214 | Forecaster | KBEALE | Create Date | 02/01/99 ▼ 430 |
|---|---|---|---|---|---|
| Forecast Date | 02/01/99 ▼ 216 | Division | Sales | Created By | SADMIN 432 |
| Status | Active ▼ 220 | Position | NE Sales Rep3 | Submit Date | 02/01/99 ▼ 434 |
| Revenue Amt | $1,200,000 | Position Type | Field Sales | Submitted By | SADMIN 436 |

418 Create Date — 424 Created By — 426 Submit Date — 428 — 422 — 212 — 408

*FIG. 20*

| | | | | | | |
|---|---|---|---|---|---|---|
| Series | Billings | 214 ▼ | | Forecaster | KBEALE | 418 Create Date 02/01/99 430 ▼ |
| Forecast Date | 02/01/99 | 216 ▼ | | Division | Sales | 424 Created By SADMIN 432 |
| Status | Active | 220 ▼ | | Position | NE Sales Rep3 | 426 Submit Date 02/01/99 434 ▼ |
| Revenue Amt | $1,200,000 | | | Position Type | Field Sales | Submitted By SADMIN 436 |
| | | 422 | | | 428 | |

438

Forecast Line Items ⟳            Show: ▼ 442   GO

| Date | Fcst | Cmt | Account | Opportunity | Description | Revenue | Upside | Downside | Margin | Prob |
|---|---|---|---|---|---|---|---|---|---|---|
| 1/1/99 | ✓ | | AK Parker | 275 Portables | Services | $50,000 | $30,000 | | | 50% |
| 1/1/99 | | | AK Parker | 275 Portables | Hardware | $65,000 | | $40,000 | $30,000 | 60% |
| 1/1/99 | ✓ | | AK Parker | 275 Portables | Networks | $25,000 | | | | 50% |
| 1/1/99 | | | AK Parker | 275 Portables | Services | $35,000 | | | | 50% |
| 1/15/99 | ✓ | ✓ | Acme | Routers + Hub | Networks | $65,000 | $45,000 | | | 60% |
| 3/15/99 | ✓ | | Acme | Routers + Hub | Install | $90,000 | | | $45,000 | 75% |
| 1/15/99 | ✓ | ✓ | Acme | Routers + Hub | Rollout | $65,000 | | $15,000 | $15,000 | 75% |

Employees — 462

- ☑ WDAVIS
  - ☐ KBEALE
  - ☐ HALACON
  - ☐ CCONWAY
  - ☐ SMILLER
    - ☐ MLEMUR
    - ☐ WTAKUDA

Employees — 464

| Name | UserID | Position |
|---|---|---|
| Walter Davis | WDAVIS | VP of Sales |
| Kim Beale | KBEALE | Regional Manager, NE |
| Hector Alacon | HALACON | Field Sales Rep, NJ |
| Chris Conway | CCONWAY | Field Sales Rep, NY |
| Susan Miller | SMILLER | Regional Manager, SE |
| Mark Lemur | MLEMUR | Field Sales Rep, FL |
| Wayne Takuda | WTAKUDA | Field Sales Rep, GA |

Forecast Line Items

| Date | Fcst | Cmt | Account | Opportunity | Description | Revenue | Upside | Downside | Margin | Prob |
|---|---|---|---|---|---|---|---|---|---|---|
| 1/1/99 | √ | | AK Parker | 275 Portables | Services | $50,000 | $30,000 | | | 50% |
| 1/1/99 | | √ | AK Parker | 275 Portables | Hardware | $65,000 | | $40,000 | $30,000 | 60% |
| 1/1/99 | √ | | AK Parker | 275 Portables | Networks | $25,000 | | | | 50% |
| 1/1/99 | √ | | AK Parker | 275 Portables | Services | $35,000 | | | | 50% |
| 1/15/99 | √ | | Acme | Routers + Hub | Networks | $65,000 | $45,000 | | | 60% |
| 3/15/99 | √ | | Acme | Routers + Hub | Install | $90,000 | | | $45,000 | 75% |
| 1/15/99 | √ | | Acme | Routers + Hub | Rollout | $65,000 | | $15,000 | $15,000 | 75% |

Revenues by Month, then by Account

| Account | Jan | Feb | Mar | Apr | May | Jun |
|---|---|---|---|---|---|---|
| Acme | 35,000 | 40,000 | 45,000 | 35,000 | 25,000 | |
| AK Parker | 10,000 | 25,000 | 25,000 | | | 30,000 |
| AG Edwards | | 25,000 | | 30,000 | | |
| Totals | 45,000 | 65,000 | 70,000 | 65,000 | 25,000 | 30,000 |

Revenues by Month, then by Account

| Account | Item | Commit | Prob | Sales Rep | Rev Cls | Rev Tp | Jan | Feb | Mar |
|---|---|---|---|---|---|---|---|---|---|
| Acme | | | | | | | | | |
| | Networks | ✓ | 60% | HALACON | Bookings | Commit | 65,000 | | |
| | Install | ✓ | 50% | HALACON | Bookings | Upside | | 50,000 | |
| | Rollout | ✓ | 50% | HALACON | | Expect | | | 65,000 |
| Acme Totals | | | | | | | 65,000 | | 115,000 |
| AK Parker | | | | | | | | | |
| | Services | ✓ | 50% | HALACON | Bookings | Commit | 50,000 | | |
| | Hardware | | 60% | HALACON | Bookings | Commit | | 65,000 | |
| | Networks | ✓ | 60% | HALACON | | Upside | 25,000 | | |
| | Services | ✓ | 50% | HALACON | Billings | | | | 35,000 |
| AK Parker Totals | | | | | | | 75,000 | 100,000 | |
| ... | | | | | | | | | |
| Grand Totals | | | | | | | 230,000 | 350,000 | |

— 480

FORECASTING AND REVENUE MANAGEMENT SYSTEM

BACKGROUND OF THE INVENTION

1. Field of the Invention

The present invention relates to sales e-business tools in general, and, in more particular, a forecasting and revenue management e-business software tool that enables users to generate and view forecasts in an integrated environment.

2. Background Information

An important part of the work performed by many sales organizations concerns forecasting sales and revenue. An accurate forecast helps companies predict cash flows and product inventory, which drive many important business decisions, such as purchasing levels and schedules. Forecasts are also valuable for many other purposes, including obtaining capital resources, human resource needs, infrastructure needs, supplier forecasts, etc.

Currently, there are e-business application tools that assist in helping organizations forecast sales and revenues. However, these tools are limited, both in how they aggregate forecast data, how they enable revenue data to be defined and manipulated, and how the revenue data are displayed to users. Furthermore, these tools provided limited facilities for generating forecast information for various management levels in an organization. For example, forecast information for a national sales manager may comprise an aggregation of forecast data provided by all of the members of a sales team organization who are subordinate to the national sales manager, wherein the forecast information for each individual member of the team can be included in the manager's forecast when relevant or automatically summarized otherwise.

SUMMARY OF THE INVENTION

The present invention comprises a system that enables users and organizations to easily generate and manage their forecasts, through use of an integrated forecast and revenue management software tool. The tool enables a forecast administrator to define one or more forecast series that is used to formulate the structure of forecast made by users of the system. This includes defining attributes of the forecasts, such as forecast period, intervals, etc. Information concerning participants who may create forecast for the forecast series is also provided by the administrator, including defining an organization hierarchy position for each participant. In conjunction with the forecast series creation, the tool enables users to easily enter a variety of forecast information through a flexible user interface, wherein the information is stored in a database or enterprise data system. Various forecast data stored in the database are then retrieved from the database based on parameters defined by the forecast series and corresponding to the user. The sales representatives may then fine-tune their forecasts and submit their forecasts to their superiors (e.g., sales managers, regional managers, etc) who occupy a next layer of management in the organization hierarchy. The managers are then enabled to adjust the forecasts and roll up forecasts made by subordinates to produce their own forecasts. This process may be recursively applied while moving up through various layers of management defined by an organization's hierarchy, wherein each manager is enabled to adjust and roll up forecasts corresponding to themselves and their subordinates.

The forecast and revenue management software tool also enables users to view forecast and revenue data through an intuitive set of user interfaces. These user interfaces present data in list and spreadsheet formats, as well as charting formats. Base on visibility rules defined for the forecast series, the users are enabled to view forecasts of other members of the organization who are subordinate to them. In addition, the system can automatically generate forecasts for members of an organization that have not already submitted their forecasts based on the visibility rules and position of those members in the organization hierarchy.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a representation of an exemplary user interface that enables a system administrator to create forecast series;

FIG. 5 is a representation of an exemplary user interface that enables the system administrator to define dates for forecast series;

FIGS. 6A and 6B are representations of an exemplary user interface that enables the system administrator to define forecast participants and their positions in an organization hierarchy;

FIG. 7 is a schematic diagram illustrating how forecast series data are stored in a database in accordance with the invention;

FIG. 17 is a representation of an exemplary user interface that enables users to view revenue opportunity data in a chart form;

FIGS. 18A-D comprise four successive dialog box user interface objects corresponding to a revenue schedule wizard that assists users in creating a revenue schedule;

FIG. 20 is a representation of an exemplary user interface containing information pertaining to summarized forecast data;

FIG. 21 is a representation of an exemplary user interface that enables users to view and create forecast line item details;

FIG. 25 is a representation of an exemplary user interface that enables a manager to view various forecast line item data corresponding to the manager's forecasts and forecast for subordinates of the manager;

FIG. 26 is a representation of an exemplary user interface that enables users to view and edit revenue data that are displayed in a spreadsheet form;

FIG. 27 is a representation of an exemplary user interface that enables users to view and enter detailed revenue data partitioned by account;

DETAILED DESCRIPTION OF THE ILLUSTRATED EMBODIMENTS

A system for generating and presenting forecast data is described in detail herein. In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
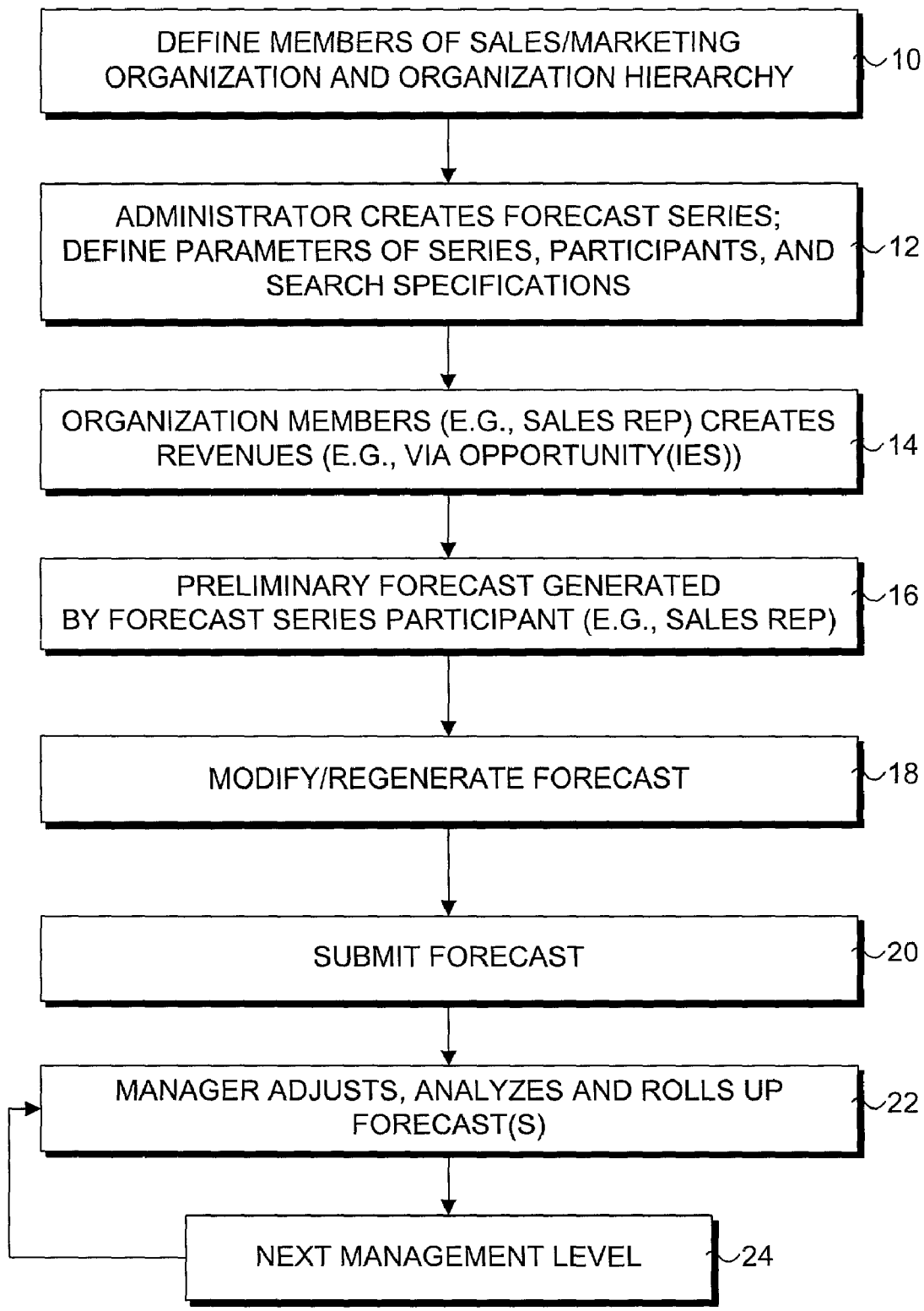
FIG. 1 is a high level flowchart illustrating the primary operations that are performed when creating a forecast in accordance with the present invention.
Figure 2:
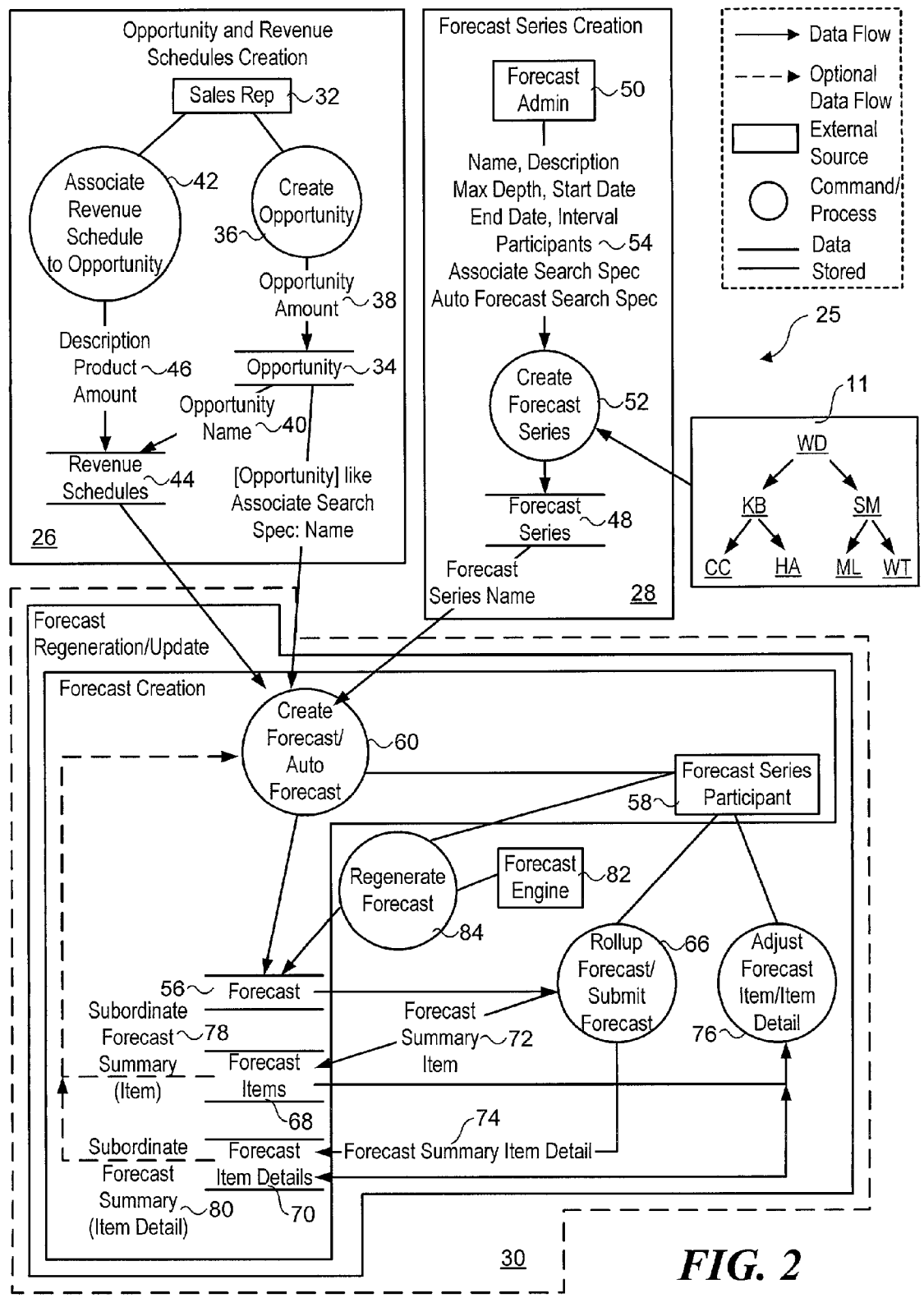
FIG. 2 is a high-level software architecture schematic diagram illustrating the process flows when producing forecasts.

A high-level flowchart corresponding to a typical forecasting process in accordance with the present invention is shown in FIG. 1. The process begins in a block 10, wherein members of a sales or marketing organization are defined, along with the hierarchy for the organization. The hierarchy defines the various management levels of the organization and identifies the report paths for each member of the organization (e.g., a sales representative reports to a region manager, who reports to a national manager, who reports to a vice president of sales, etc.) An exemplary organization hierarchy 11 is shown in FIG. 2.

In a block 12, an administrator creates a forecast series. A forecast series includes a set of parameters defining attributes of forecasts that can be created from the forecast series, such as a series where users can create a weekly forecast over opportunities in a particular sales region. The forecast series also defines who may participate in creating forecasts based on the series (the Forecast Series Participants) and provides search specifications that are used in creating forecasts, including specifications pertaining to automatic forecast generation.

Next, sales representative of the organization create Revenues in a block 14. A Forecast is derived from units called Revenue Schedules (or Revenues). Revenues can be the child of an Account, Agreement, Campaign, Contact, Internal Product, Opportunity, Project or Quote. Revenues are typically created through Opportunities—e.g., a "Primary Revenue" is created whenever an Opportunity is created.

After a Forecast Series has been defined and Revenues have been created, a preliminary forecast may be generated by a Forecast Series Participant, such as a sales representative, as provided by a block 16. Normal users can only create forecasts for themselves; users with manager privileges can create a forecast for themselves and their subordinates. To create a forecast, the user specifies a forecast series and date to forecast upon. When a forecast is created, a Forecasting Engine searches through applicable opportunities and Revenues that match criteria specified by the administrator for the Forecast Series and any applicable visibility rules. The Forecasting Engine then creates forecast items and item details for the forecast. If desired, the user can make modifications to the revenue input data from which the forecast is derived and have the forecast regenerated in a block 18. The forecast can then be adjusted (independent of the revenue input data) by the sales rep and then "submitted" to his or her manager in a block 20.

Next, in a block 22, a manager may adjust, analyze, and "roll up" forecasts that have been submitted by subordinates. Once a forecast has been submitted, the submitting user can no longer modify or delete the forecast. However, users who are higher up in an organization's hierarchy, such as regional managers, national managers, vice presidents, etc., can make adjustments to forecasts that have been submitted by persons subordinate to them. In addition to making forecast adjustments, managers are enabled to analyze forecasts submitted by their subordinates through a variety of views. Furthermore, the managers may "roll up" a forecast of a subordinate, whereby the rolled up forecast appears as a forecast summary item on the manager's forecast.

The operations that may be performed by managers in block 22 are then recursively enabled up the organization hierarchy, as depicted by a next management level block 24. For instance, suppose an organization has a sales organization with a three-level hierarchy corresponding to organization hierarchy 11 comprising a sales representative level including four sales representatives, a regional manager level including two regional managers, and a national manager level including a single national manager. The sales representatives submit their forecasts to their respective regional managers, who are enabled to adjust, analyze, and roll up forecast submitted to them to create their own forecast. The regional managers then submit their forecasts to the national sales managers, who, once again, may adjust, analyze and roll up data pertaining to these regional manager forecast.

An overview illustrating an exemplary architecture 25 by which the invention may be implemented is shown in FIG. 2. Architecture 25 includes three major blocks, including an Opportunity and Revenue Scheduling creation block 26, a Forecast Series creation block 28, and a Forecast creation/regeneration block 30.

In one embodiment, Opportunities and Revenue Schedules are created in the following manner. A sales representative (sales rep) 32 creates an Opportunity 34 using a Create Opportunity process 36. The Opportunity includes an Opportunity Amount 38 and an Opportunity Name 40. Revenue Schedules are then associated with Opportunities using an Associate Revenue Schedule to Opportunity process 42, producing Revenue Schedules 44, which include descriptions, products, and amounts 46.

A Forecast Series 48 is created by a Forecast Administrator 50 using a Create Forecast Series process 52. The Forecast Series includes various parameters 54 that are used to define the Forecast Series, as well as input corresponding to organization hierarchy 11. A Forecast 56 is created by a Forecast Series Participant 58 via a Create Forecast/Auto Forecast process 60, based on various inputs, including Revenue Schedules 44, applicable Opportunities 34, and an applicable Forecast Series 48. The applicable opportunities are identified using an opportunity search criteria 62. The applicable Forecast Series is identified by its Forecast Series Name 64. The Forecast Series Participant may Rollup Forecasts or Submit Forecasts using a like-named process 66, thereby producing Forecast Items 68 and Forecast Item Details 70, which include Forecast Summary Items 72 and Forecast Summary Item Details 74, respectively. The Forecast Series Participant may also adjust forecast items and forecast items details using a process 76.

As discussed above, managers are enabled to adjust, analyze, and rollup forecasts submitted by their subordinates in a recursive manner. Furthermore, these adjusted and/or rolled up forecasts may be used in generating the manager's forecast, as indicated by a Subordinate Forecast Summary Item 78 and a Subordinate Forecast Summary Item Detail 80. Forecasts can also be Regenerated using a Forecast Engine 82 and a Regenerate Forecast process 84.

Figure 3:
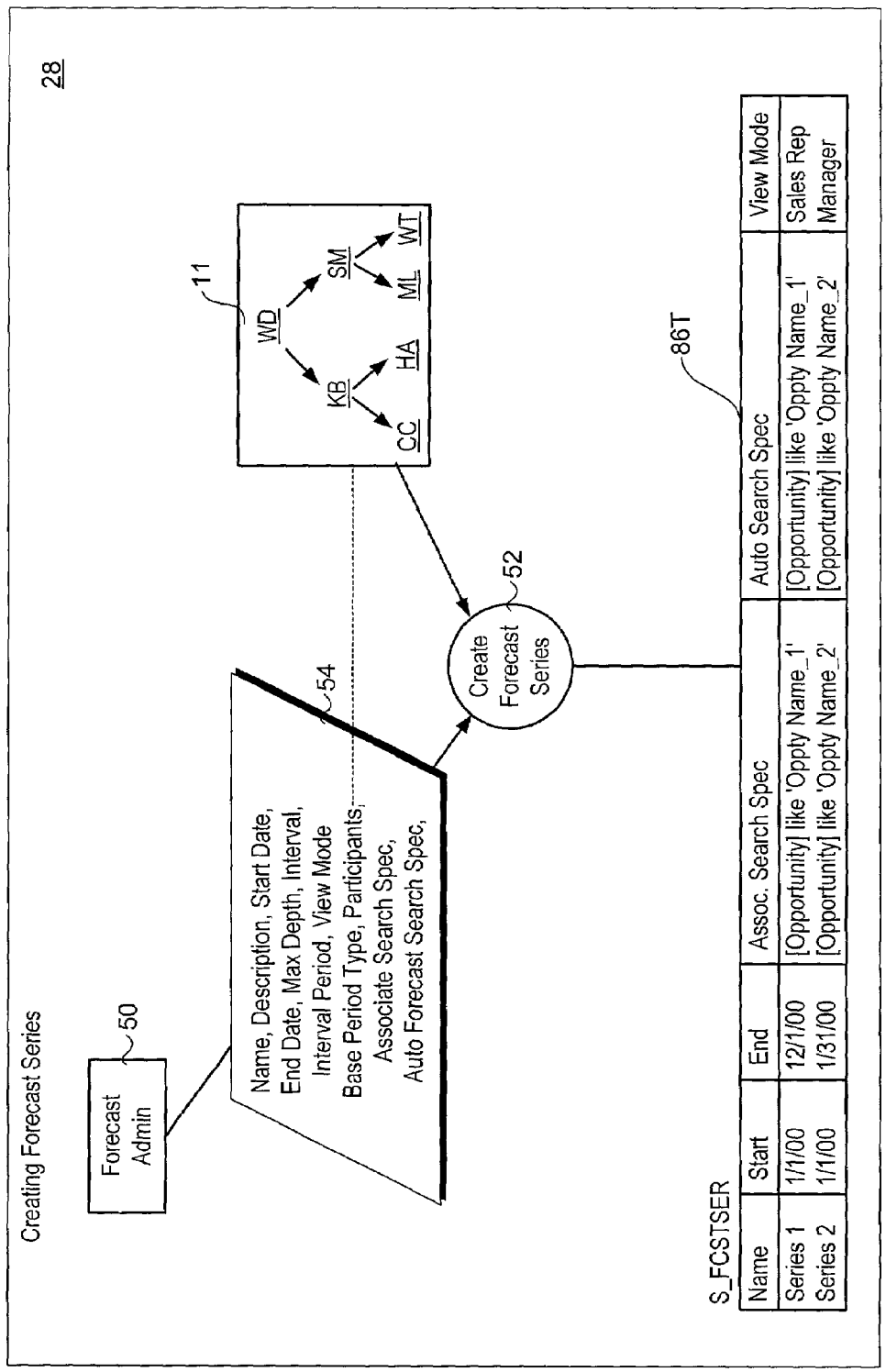
FIG. 3 is a block schematic diagram illustrating processing, inputs, and data storage corresponding to the creation of a forecast series.

Further details of Forecast Series Creation block 28 are shown in FIG. 3, wherein exemplary values for several of parameters 54 are stored in an S_FCSTSER database table 86T. Parameters 54 include a Name, Description, Start Date, End Date, Max Depth, Interval, Interval Period, View Mode, Base Period Type, Participants, Associate Search Spec, and Auto Forecast Search Spec. Additional Description and Comments corresponding to several of these parameters are shown below in Table 1

TABLE 1

| Parameter | Description/Comments |
|---|---|
| Name, Description | For the forecast series. Neither needs to be unique, but <name, start date> must be unique |
| Start Date, End Date | Earliest date that forecasts can be created |
| Base Period Type | Period over which forecast items are aggregated, e.g., month, quarter, etc. |
| Interval, Interval Period | Frequency at which forecasts are made within a base period |
| Max Depth | Maximum number of levels below the current hierarchy level to search for forecast items |
| Associate Search Spec | Search specification for opportunities/Revenues to include. |

Administrators are able to define a forecast series using a Forecast Series form 100, as shown in FIG. 4. The forecast series form includes several fields including a name field 102, a description field 104, a frequency field 106, and automatic forecast filter field 108, a manual add filter 110, and active field 112, and a mode field 114. Data values are optional for all fields except name field 102, which requires a data value. The administrator is enabled to Add, Delete, Copy, and Modify forecast series records on this form.

A forecast name, description, and frequency are entered in fields 102, 104, and 106, respectively. The name of a query on a Revenue Analysis tab that tells the system which records to automatically pull into the forecast is entered in automatic forecast filter field 108. If a query is not specified here, then all of a sales representative's revenue schedule records (within the applicable date range) will be pulled into the forecast.

The name of a query on the Revenue Analysis tab that identifies which records to automatically pull into the forecast is entered in manual add filter field 120. If a query is not specified here, then all of a sales representative's revenue schedule records (within the applicable date range) will be pulled into the forecast.

By placing a check in active field 112 (via a checkbox control), the administrator can indicate whether or not the forecast series is available for forecasting purposes. The default value for this field is on (i.e., checked). By removing the check, the forecast series item is marked as invalid, whereby it can not longer be selected for the creation of new forecasts.

Mode field 114 comprises a picklist that enables the administrator to define the visibility mode for the forecast. The choices in the picklist include: "Sales Rep," "Manager," "All," and "All Across Organizations." This value specifies a visibility mode applied to the revenue table in the selection of forecast records. A visibility of "Sales Rep" means that only records assigned to the sales rep that owns the forecast will be considered for inclusion in the forecast. A visibility of "All" implies that all revenue records within the organization will be considered for inclusion in the forecast. The default value for this field is "Sales Rep."

The administrator defines applicable forecast dates for a forecast series in a Forecast Series Dates form 116, as shown in FIG. 5. A forecast date, corresponding to the name of the forecast series is entered in a date field 118, while start and end periods corresponding to the forecast date are entered in a start period field 120 and an end period field 122, respectively. In an exemplary UI embodiment, Forecast Series Dates form 116 is displayed below Forecast Series form 100 in the same window.

Administrators are enabled to define the Forecast Series Participants for each Forecast Series in a Forecast Participants form 124, as shown in FIGS. 6A and 6B. In an exemplary UI embodiment, Forecast Participants form 124 is displayed below Forecast Series form 100 (not shown). Administrators will be able to Add, Delete, Copy, and Modify the records in the Forecast Series form, while being able to Add or Delete participants from Forecast Participants form 124.

The list of potential participants is derived from organization hierarchy 11. Generally, in addition to the hierarchy information, various data for each member of the organization will be stored, including the members name, position, position type, region, division, and department. Accordingly, when an organization member is selected as a participant, the foregoing information is displayed in various corresponding fields on Forecast Participants form 124, including a Last Name field 126, a First Name field 128, a Position field 130, a Position Type field 132, a Region field 134, a Division field 136, and a Department field 138. In addition, the person's name displayed in a "Rolls Up To" field 140 will correspond to the direct report for the participant.

Selecting to create a new record via a forecast participants applet will display an associative Add Forecast Participants dialog 142 shown in FIG. 6B, whereby the user can query and select an entire group of employees for addition into the list of participants in the Forecast Participants form. Dialog 142 further includes a parent position field 144 and a manager field 146 in addition to the fields shown in Forecast Participants form 124, wherein the information for these fields is derived from organization hierarchy 11.

With reference to FIG. 7, the data used to associate forecast dates and participants with forecast series are stored in S_FCSTSER table 86T, an S_FCST_SER_DATE table 148T, and an S_FCST_SER_POSTN intersection table 150IT.

Figure 8:
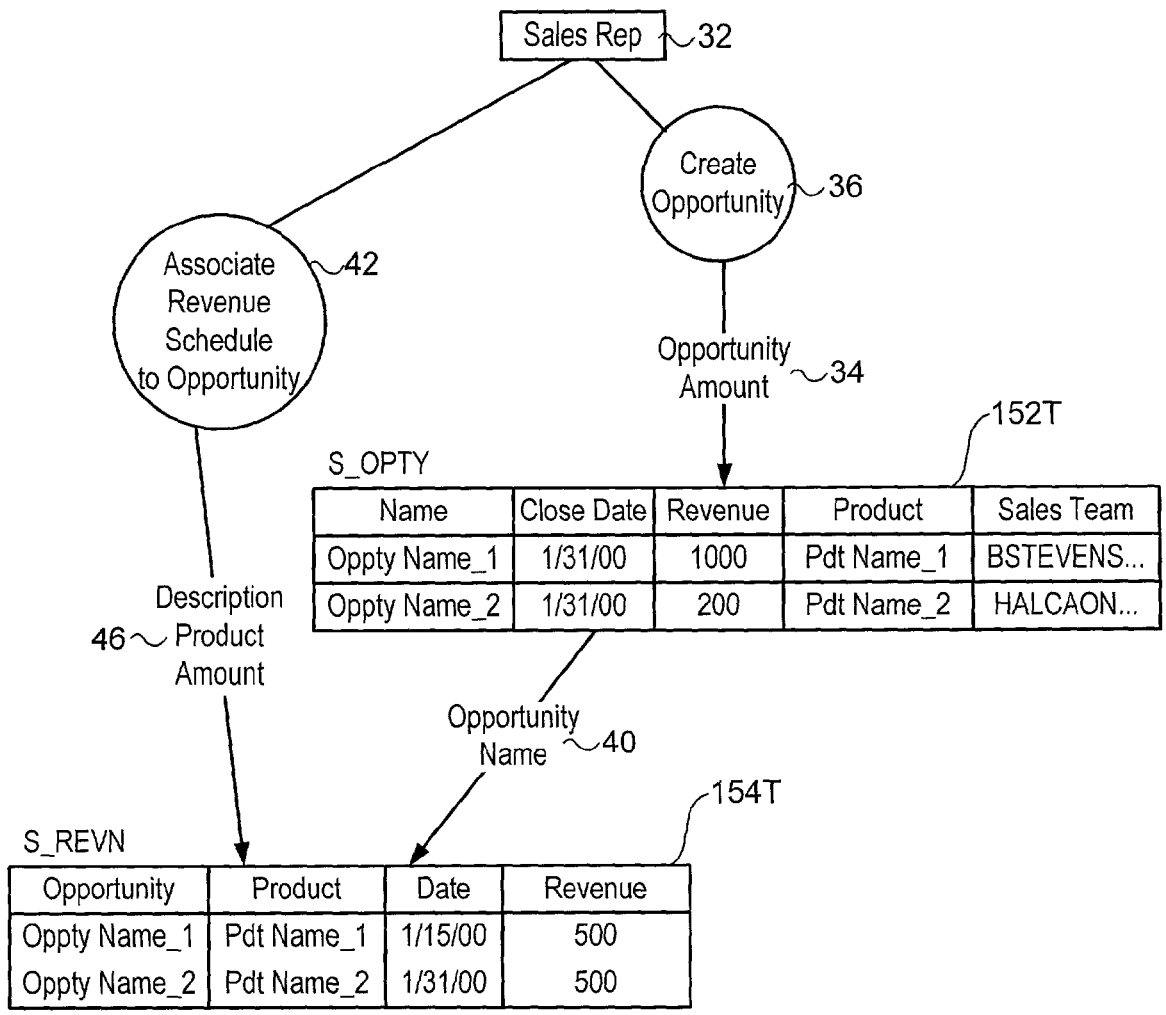
FIG. 8 is a block schematic diagram illustrating processing, inputs, and data storage corresponding to the creation of forecasted revenues.

Creation of a Revenue schedule can be performed concurrently with creation of a forecast series, or before or after creation of the forecast series. To create a Revenue Schedule, a user uses an existing Account, Agreement, Campaign, Contact, Internal Product, Opportunity, Project or Quotes, or creates a new object corresponding to one of these objects. The user then creates and associates additional Revenues with the parent object. Typically, this will be done with the creation of a new opportunity or use of an existing opportunity. In the case of an Opportunity, a Primary Revenue (or Summary Revenue) is created for the Opportunity. The user then creates and associates Revenues with the parent object. As shown in FIG. 8, Opportunity data are stored in an S_OPTY table 152, while Revenue data are stored in an S_PROD_REVN table 154. (It is noted that the majority of fields in each of these tables are not shown due to space constraints.)

When a user creates a forecast, the following Opportunities or Revenues that match the criteria specified in the corresponding forecast series are included:

1) The revenue schedule is visible using the View Mode;
2) If the Forecast Engine is generating a forecast, it picks up the revenue schedule that fulfills the Auto Forecast Search Spec;
3) If the user is manually adding forecast items through the Revenue Associate applet, include the revenues that fulfill the Associate Search Spec;
4) Additionally, the user can create new Forecast Line Items in the Revenue Associate applet.

The information from the revenue schedule is then vertically partitioned into the business components for Forecast Item and Forecast Item Detail. The Forecast Item contains static or "header" information, such as Opportunity, Account, etc. The Forecast Item Detail contains numerical information pertaining to the forecast item.

Figure 9:
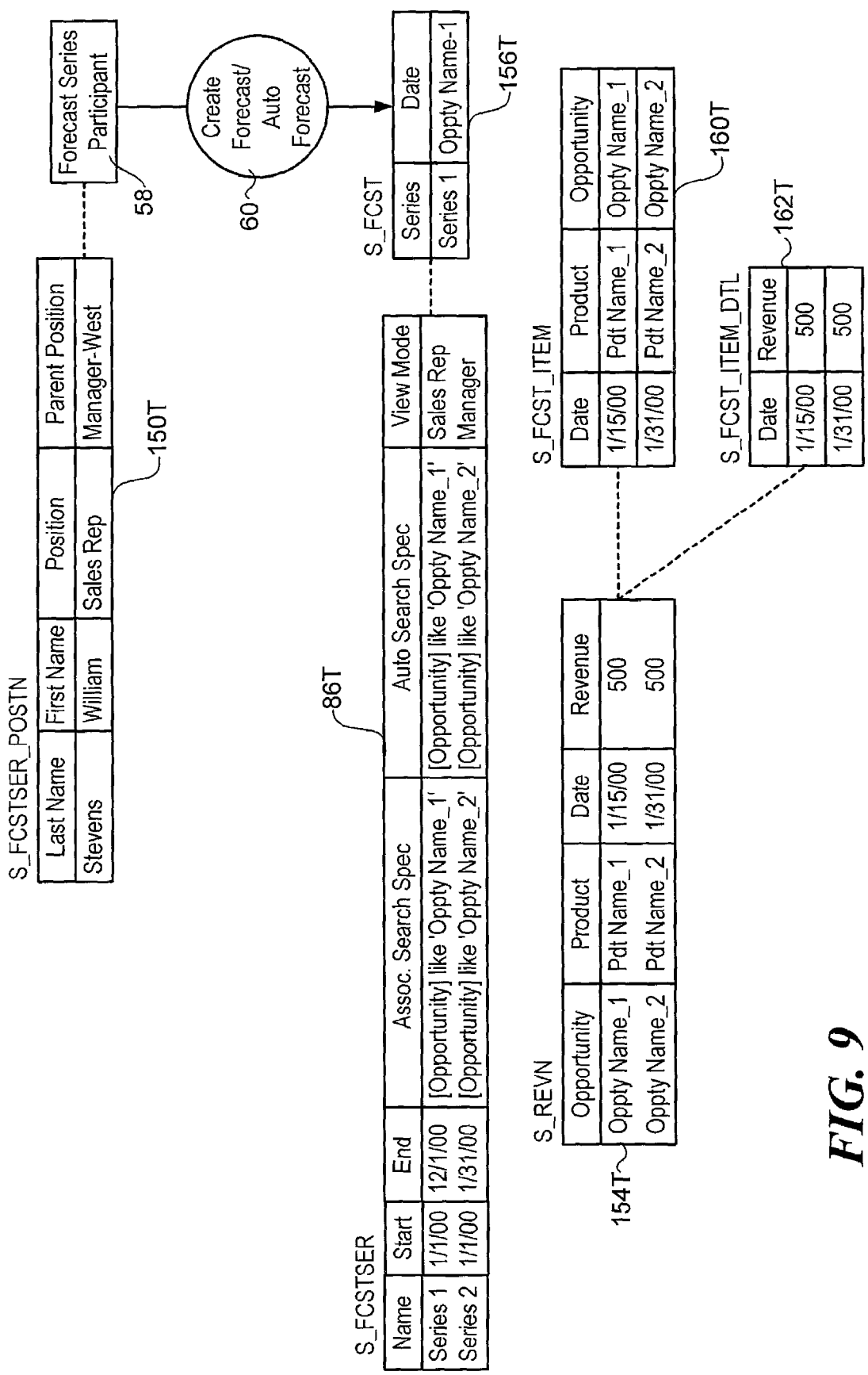
FIG. 9 is a block schematic diagram illustrating processing, inputs, and data storage corresponding to the creation of forecasts.

An exemplary set of data records stored in various tables illustrating how Forecast Items and Item Details are derived from Revenue Schedules is shown in FIG. 9. The tables include S_FCSTSER_POSTN intersection table 150IT, S_FCSTSER table 86T, S_REVN table 154T, an S_FCST table 156T, an S_FCST ITEM table 160T, and an S_FCST_ITEM_DTL table 162T.

Visibility and Inclusion

The various items that are included in a forecast (or in the aggregated data corresponding to a forecast) are determined, in part, on their "visibility." In short, a set of visibility rules define which items are "visible" to the Forecast Engine, and which items are not.

The items included in a forecast can be divided into the categories shown in TABLE 2 below.

TABLE 2

| Item Type | Description |
| --- | --- |
| Own Item | Opportunity or Revenue Schedule that meets Associate Search Spec, e.g., Revenues from the West Coast. |
| Item | Included from subordinate's forecast because of Visibility Rules, described below. Could be a subordinate's 'Own Item' or an indirect subordinate's Summary Item. |
| Direct Summary | Summary created over direct subordinate's forecast. |
| Summary | Can be directly inherited or created(auto-forecast). |
| Own Summary | Summary created over all items in own forecast. |

Figure 10:
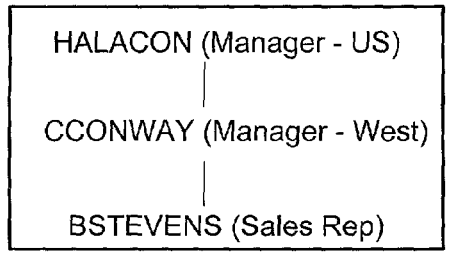
FIG. 10 is a schematic diagram illustrating an exemplary organization hierarchy comprising three levels.

Suppose that an organization has a hierarchy shown FIG. 10, wherein a Sales Rep having a userID of BSTEVENS is managed by a Western Region Manager having a userID of CCONWAY, who in turn is managed by a U.S. manager having a userID of HALACON. Given this hierarchy, the classifications for items in HALACON's forecast are shown in TABLE 3 below.

TABLE 3

| Item | Originating Forecast | Item Type |
| --- | --- | --- |
| Opportunity | HALACON | Own Item |
| Summary | CCONWAY | Direct Summary |
| Opportunity | CCONWAY | Item |
| Summary | BSTEVENS | Item |
| Opportunity | BSTEVENS | Item |
| Summary | HALACON | Own Summary |

Figure 11A:
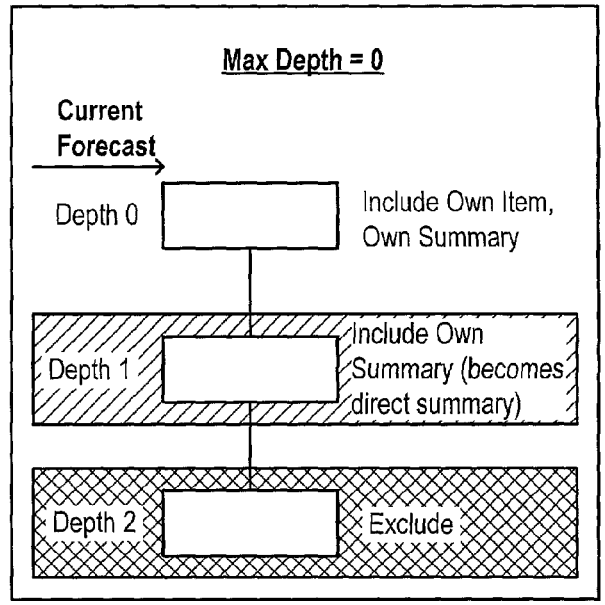
FIG. 11A is a block schematic diagram illustrating visibility rules corresponding instances when a maximum visibility depth=0.
Figure 11B:
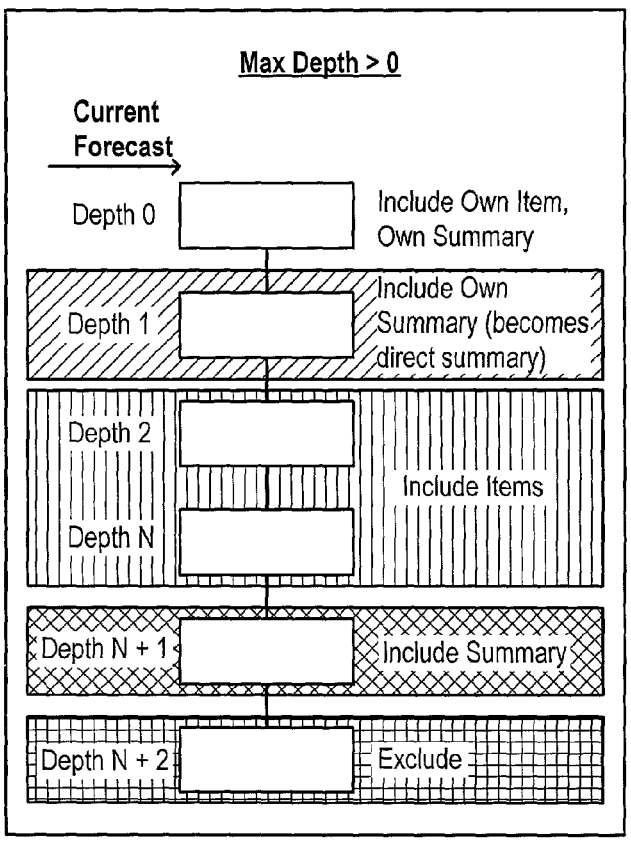
FIG. 11B is a block schematic diagram illustrating visibility rules corresponding to instances in which a maximum visibility depth>0.

The first category (Own Item) consists of items created directly from specific Revenues, as described above. The remaining types are included because of rules involving Max Depth, which are shown in FIGS. 11A (Max Depth=0) and 11B (Max Depth>0). According to the Max Depth filtering rules, items are filtered based on the following.

1) The current forecast is depth 0.
2) If (Max Depth=0), include only summaries from direct subordinates.
3) If (Max Depth>0)
   i. Include both items and summaries from direct subordinates.
   ii. Include items only from subordinates from levels 2 to N.

iii. Include summary item from level (N+1)

iv. Exclude all other items

At any level, the summary should be equivalent to the aggregation of all 'Own Items' at lower levels, i.e. you should get the same value if you took a summary record, and if you summed all the revenues/Forecast Items from all levels below, inclusive.

Adjusting a Forecast

Managers can create adjustments on their subordinate's Forecast Details (depth must be >0, to ensure that subordinate details are included in the manager's forecast). Creating an adjustment on an item causes the original item to be shadowed, and the adjusted item to replace it. However, the original item retains its original, non-adjusted value when viewed by the subordinate who created it.

The manager's adjustments are not visible to his subordinates. The adjustments are visible to him and his superiors. To view the item's value before adjustment, they can drill down into its Adjustment History, which displays all values of the item, when it was adjusted, and the person who adjusted it. The manager's superiors can themselves adjust his or her item, hence causing the manager's adjustment to be shadowed by the new values entered by the managers superiors. Shadowing values is accomplished by storing two (or more) records in the database for each shadowed value—one for the original, and others for each time the item is adjusted by another person in the organization hierarchy.

In one embodiment, when higher level managers review the forecast, the manager will see the highest level adjustment made by each of his or her subordinates. For example, suppose a user is a level 3 manager and there is a list of deals, wherein one deal has not been adjusted by any manager subordinate to the level 3 manager, a second deal that was adjusted by a level 1 manager, and a third deal that was adjusted by the level 1 manager and his level 2 manager. In this instance, the first deal is shown unadjusted, the second deal is shown with the level 1 manager's adjustment, and the third deal is shown with the level 2 manager's adjustment and not the level 1 manager's adjustment.

Figure 12:
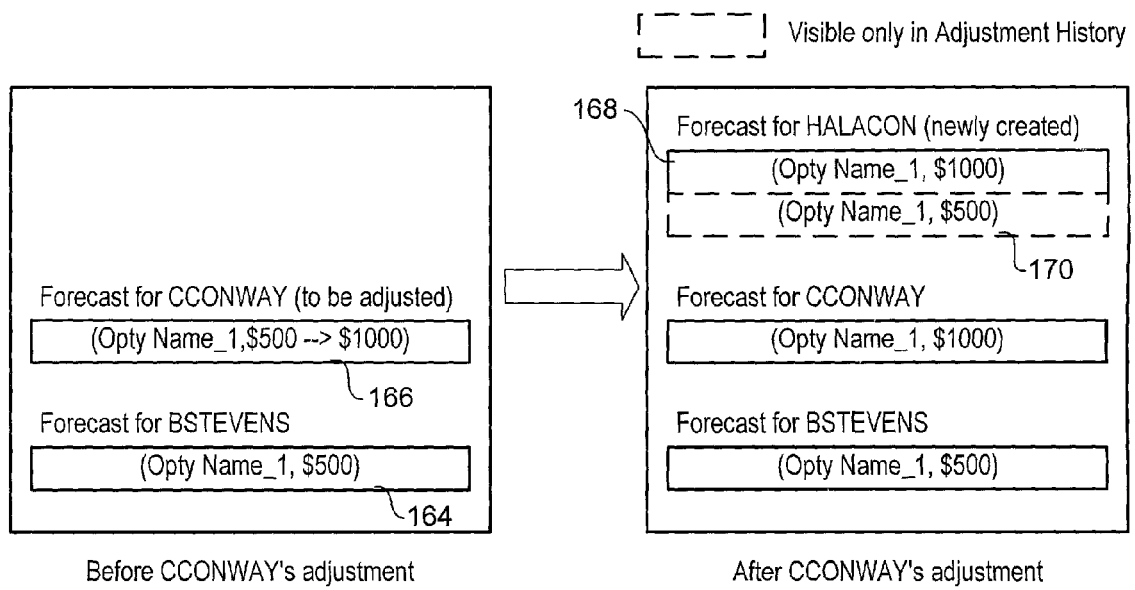
FIG. 12 is a block schematic diagram illustrating the before and after affects of an adjustment by a subordinate's forecast by a manager.

An exemplary effect of adjusting a forecast is shown in FIG. 12. In this example, a single opportunity named Opty Name_1 is originally valued by a sales rep with a userID of BSTEVENS at $500, as shown in a block 164. In Western Region manager CCONWAY's forecast, CCONWAY changes the value for the opportunity to $1000, as shown in a block 166. Accordingly, when U.S. manager HALACON reviews his forecast, the value for the opportunity Opty Name_1 has been changed to reflects CCONWAY's adjustment, as shown in a block 168. If desired, HALACON can see the original value by looking at the adjustment history for the opportunity, as shown in a block 170.

Rolling up a forecast causes a summary row to be created over the forecast items. The summary row aggregates the numerical information for the revenues and creates a Forecast Item with an Item Type of 'Own Summary'. The summary row created will now be included into forecasts created at higher levels. Notably, when a manager manually creates a forecast, the summary items from his subordinates may not yet be available. If the subordinate's summary rows are unavailable, the Forecast Engine creates a forecast for them.

Figure 13:
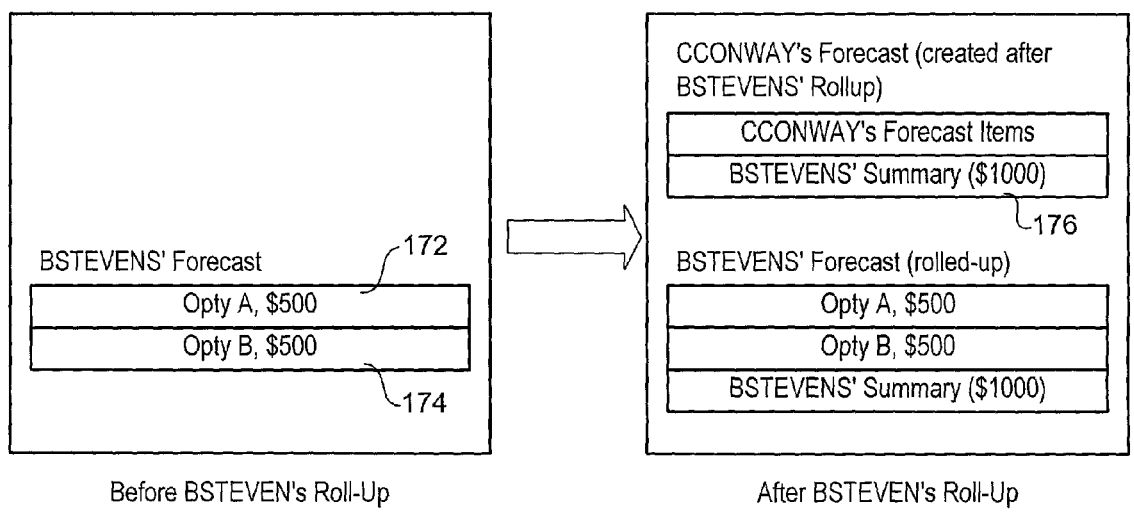
FIG. 13 is a block schematic diagram illustrating the before and after affects of rolling up individual forecast items into a summary item.

An exemplary effect of rolling up a forecast is shown in FIG. 13. In this instance, BSTEVENS creates an original forecast including two forecast items named Opty A and Opty B, each valued at $500, as shown in blocks 172 and 174. BSTEVENS' forecast is then rolled-up, producing a single Summary Item entry of $1000 in CCONWAY's forecast, as shown in a block 176.

Forecast Regeneration

Regenerating a forecast causes the forecast to be recreated using the latest forecast data, e.g., adjusted data or rolled-up/submitted forecast summaries. If a subordinate's forecast summary is required and it is missing (the subordinate has not rolled up his forecast), the Forecast Engine automatically creates the forecast and its summary for that subordinate, using the "Auto Forecast Search Spec" specified in the Forecast Series.

Figure 14:
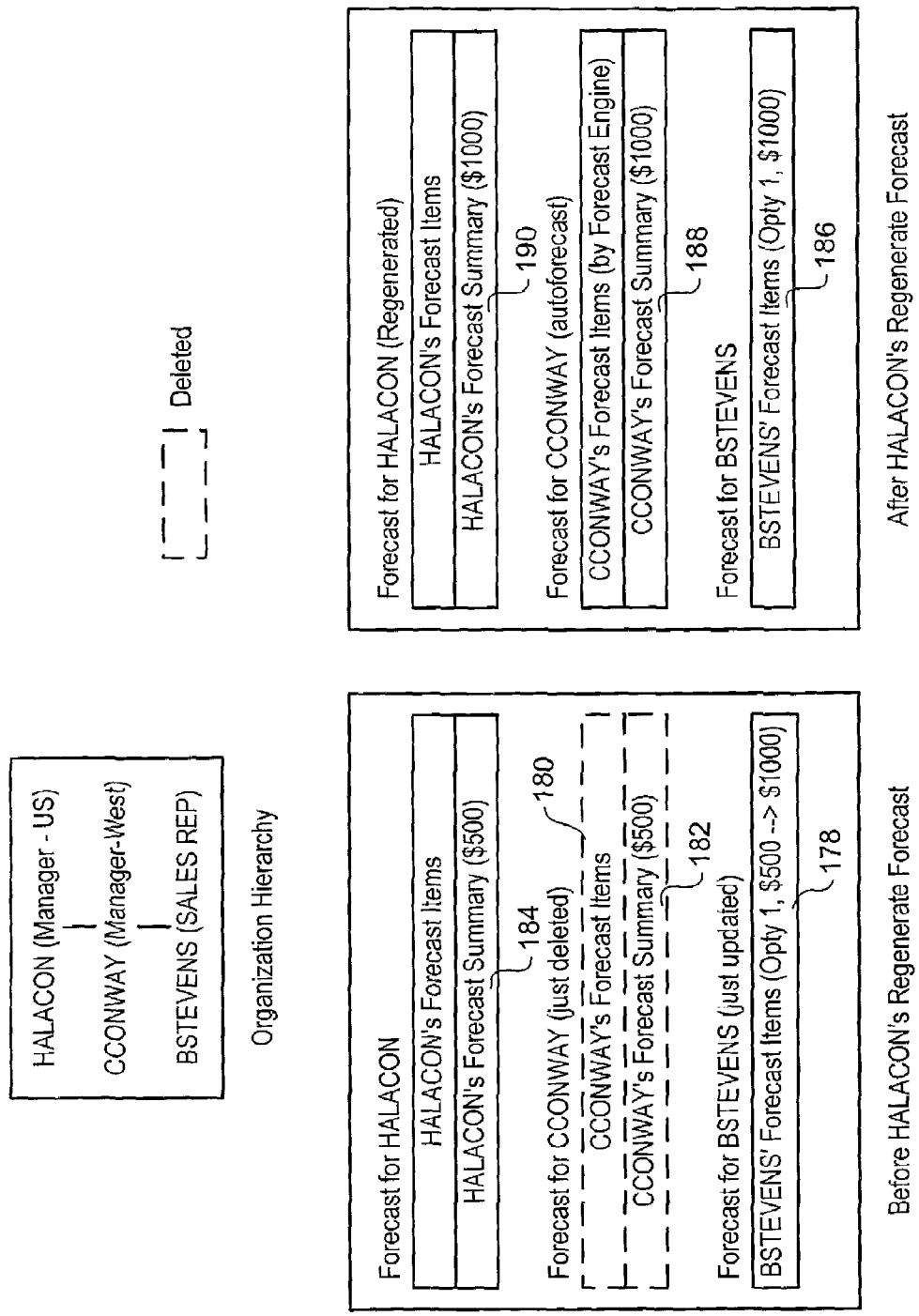
FIG. 14 is a block schematic diagram illustrating the before and after affects of performing a forecast regeneration operation after original forecast data has been changed.

An exemplary set of results for a forecast regeneration is shown in FIG. 14. In this example, BSTEVENS has changed his forecast for Opty 1 from $500 to $1000, as shown in a block 178, while CCONWAY has just deleted her forecast, as shown by deleted Forecast Items and Forecast Summary blocks 180 and 182. In addition, HALACON's forecast includes a Forecast Summary of $500, as shown in a block 184.

After HALACON's forecast has been regenerated, BSTEVEN's forecast reflects the change of Opty 1 to $1000, as shown in a block 186. Since CCONWAY's forecast has been deleted (and is thus missing), the system automatically generates a forecast for her using the "Auto Forecast Search Spec in the applicable Forecast Series. This produces a Forecast Summary value of $1000, as indicated by a block 188. It is noted that this summary value is less than that shown in block 182—this may be the case, since the search specification in the manual Associated Search Spec field is used for forecasts that are not automatically generated, whereby a different summary value may result if the manual and automatic search specifications are different. Finally, the Forecast Summary value of HALACON's Forecast Summary in a block 190 has been changed to $1000, thereby reflecting the new Forecast Summary value for CCONWAY.

Submitting Forecasts

Submitting a forecast causes it to become uneditable—the user cannot add, edit or delete items. The submitted forecast can still be included into manager's forecasts. The manager can still make adjustments on forecast items originating from the forecast, since the record affects only his or her forecast, and not the original (subordinate's) one. A forecast can be unsubmitted by the submitter's manager or the system administrator. This is implemented through a state model and visibility—the state model gives the restriction against users unsubmitting their own forecast, and visibility ensures only subordinate forecasts are available for users to modify. For example, managers can unsubmit subordinates' forecasts, while SADMIN (system administrator) can unsubmit any submitted forecast.

Figure 15:
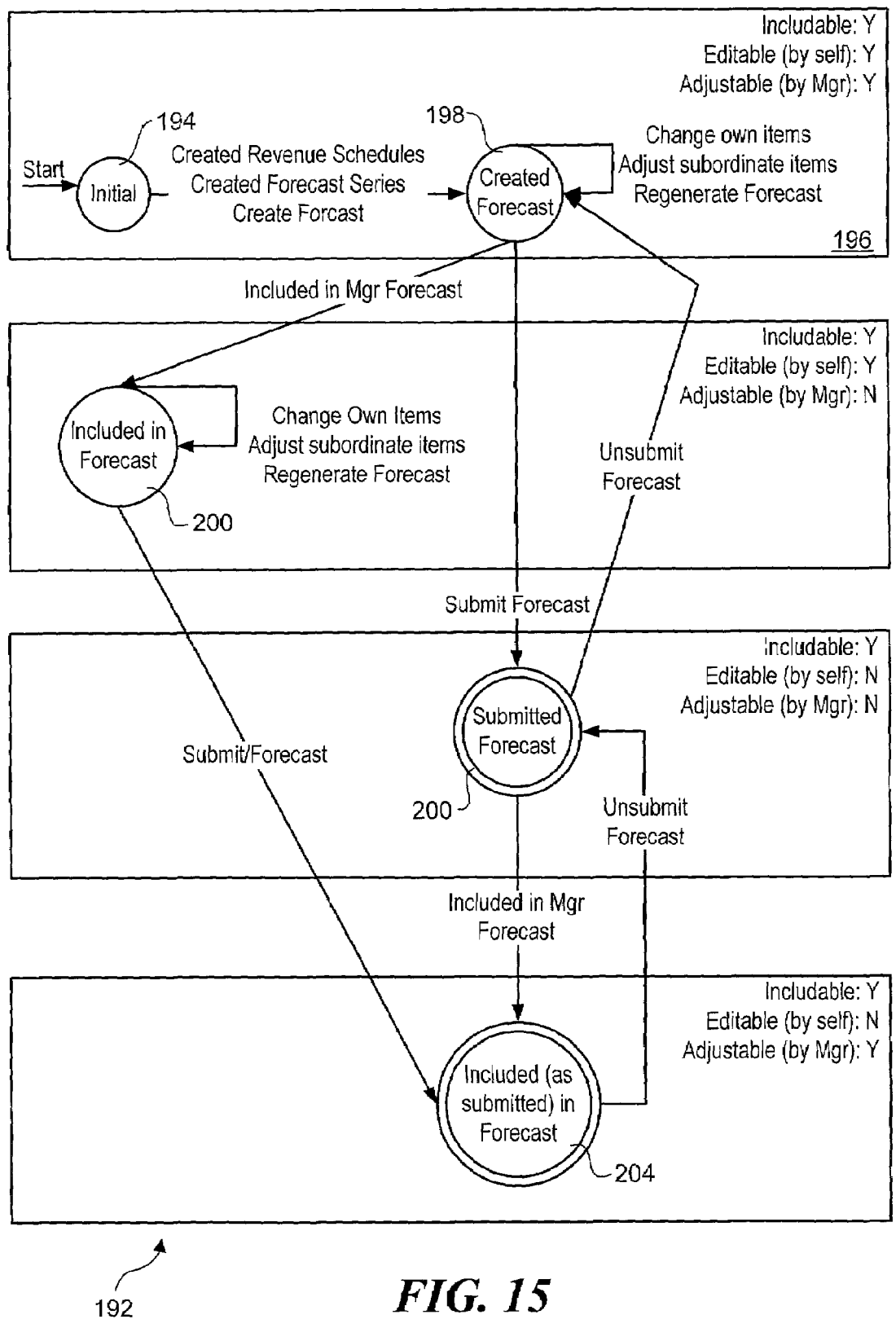
FIG. 15 is a state diagram illustrating various process states that are encountered during the creation of a forecast.

A state diagram 192 corresponding to the state model is shown in FIG. 15. The processing starts with an initial state 194 in a block 196. A user creates revenue schedules and administers create forecast series to create a forecast, corresponding to a created forecast state 198. In this state, a user can change their own items, adjust subordinate items (if a manager), and regenerate forecast.

If a subordinate' unsubmitted forecast is used in a managers forecast, the state is advanced to an included in forecast state 200. In this state, a manager can change his own items, adjust subordinate items, and regenerate forecasts.

Once a forecast has been submitted, the state becomes a Submitted forecast state 202. As discussed above, submitted forecasts cannot be edited or deleted. However, they can be unsubmitted by persons at higher levels in an organization's hierarchy, or by a system administrator.

When a subordinate's submitted forecast included in a manager's forecast, the corresponding state is an Included (as submitted) Forecast state 204. In this state, the manager can adjust and/or unsubmit the subordinates submitted forecast.

User Interface

Figure 16:
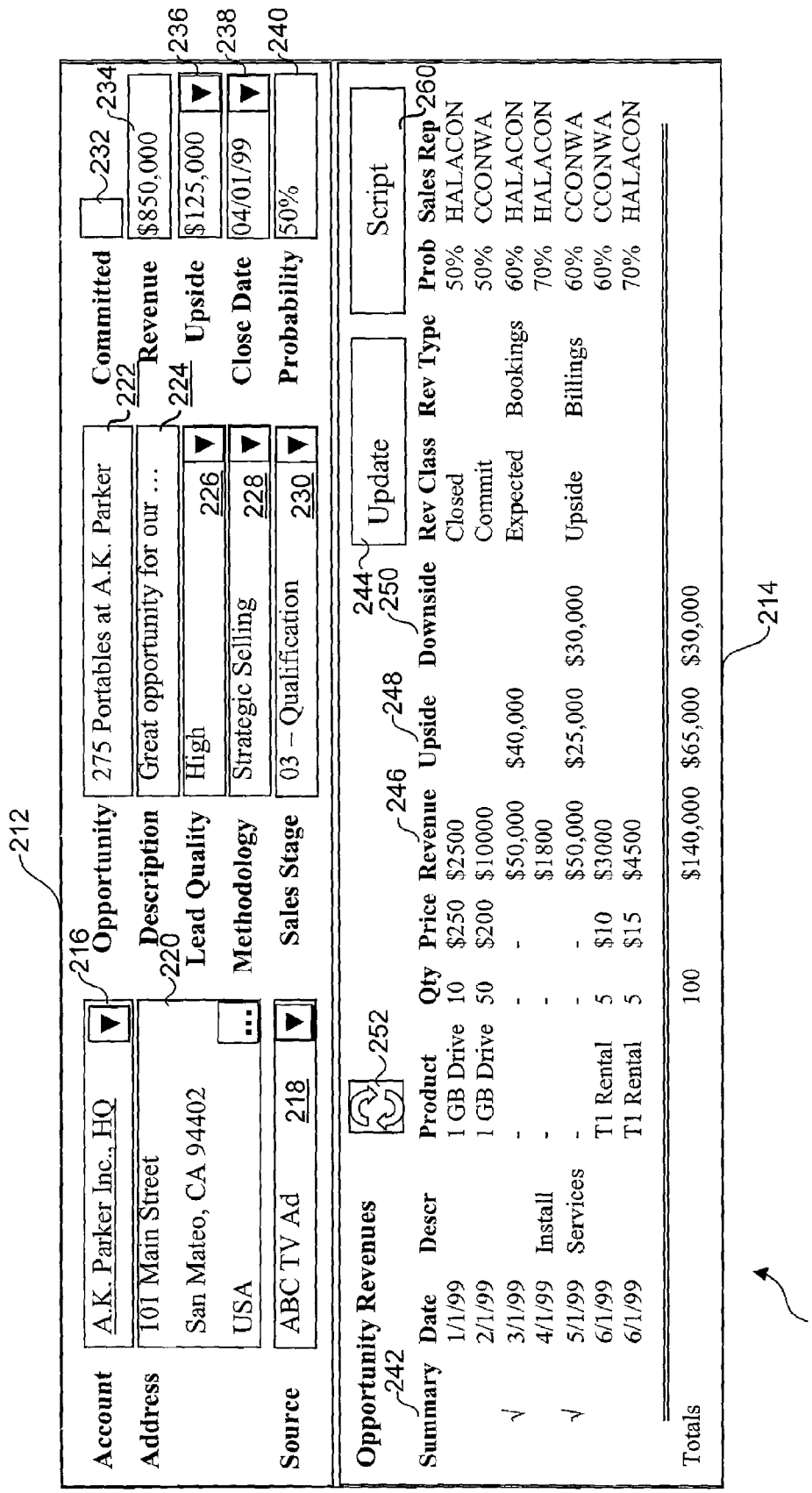
FIG. 16 is a representation of an exemplary user interface that enables users to enter revenue opportunity data.

An important step in forecasting and management is to enable users to enter opportunity and/or forecast data into the database accessed by the forecast tool. An exemplary Opportunity Revenue applet 210 that enables users to enter opportunities information is shown in FIG. 16. Opportunity revenue applet 210 includes an Opportunities header form 212 and an opportunities Revenues form 214. Opportunities header form 212 includes various edit controls in which static opportunity information is entered, including Account and Source picklist 216 and 218, an Address edit box 220, an Opportunity edit box 222, a Description edit box 224, a Lead Quality picklist 226, a Methodology picklist 228, and a Sales Stage picklist 230.

The user may identify an opportunity has been committed by marking a Committed check box 232, while an anticipated amount of revenue for an opportunity is entered in a Revenue edit box 234. Optionally, the user may enter an "upside" value corresponding to an increase in revenue if things go well by selecting an upside value from an Upside picklist 236. A Close Date picklist 238 is used to select an anticipated or actual close date for the opportunity. Additionally, a probability value comprising a predicted chance of closing the opportunity is entered in a Probability edit box 240.

Opportunity Revenue Schedule form 214 enables users to enter and view various detail revenue schedule information for the opportunity. In one embodiment, this information is presented to the user in a tabular view similar to that shown in FIG. 1. If a check mark is placed in a Summary column 242 for a given row, the data in that row corresponds to a "summary" level revenue schedule item, while leaving the column unchecked indicates the row contains "detail" data. In addition to the columns shown, addition columns corresponding to opportunity information may be provided.

In addition to the fields shown, various additional fields are not shown due to space constraints. These fields include Flag, Date, Currency, Part Number, Product, Product Line, Description, Quantity, Price, Revenue, Cost, Margin, Revenue Class, Revenue Type, Sales Rep, Lock Assignment, Comments, Account, Opportunity, Contact, Project, Service Request, Campaign, Partner, Quote, Quote Number, and Agreement fields.

After a user has entered various opportunity revenue schedule detail information, the user can activate an "Update" button 244 to copy the values in a Revenue field 246, an Upside field 248, a Downside field 250, and Margin and Cost fields (both not shown) to the opportunity itself.

In addition to the "list" tabular view for Opportunity Revenues form 214 shown in FIG. 16, a user can display a set of graphs (charts) derived from aggregated data for selected schedule periods and selected products/attributes by activating a toggle button 52, wherein Opportunity Revenue form 214 is filled with an exemplary set of charts by an Opportunity Revenue Graph applet 214A in FIG. 17. The user can select a field to aggregate on via a "Show" drop down control 254, including "Revenue", "Upside", "Downside", "Quantity", "Price", "Cost", and "Margin". A "By" drop down control 256 enables users to toggle through a list of choices, showing their data by Week, Month, Quarter, Year, Calendar Week, Calendar Month, Calendar Quarter, and Calendar Year. A "Then" drop down control 258 enables the end user to toggle through a list of choices, showing the information by Revenue Class, Revenue Type, Product, Product Line, Probability, Sales Rep, or Description. In addition, drilling down on any of the bars in the graph and then toggling back to the list view will show just those line items applicable to the drilled down area of the graph.

Returning to FIG. 16, activation of a "Script" button 260 on Opportunities Revenue form 214 enables users to automatically generate a list of revenues using a Revenue Schedule Wizard. The wizard walks the user through a set of choices, as illustrated by an exemplary set of revenue wizard UI dialogs shown in FIGS. 18A-D, and then generates a revenue schedule for them.

With reference to FIG. 18A, upon activating "Script" button 260, a first dialog 262 is launched, containing edit controls that enable a user to provide scheduling information that is used to define the automatically generated schedule, including, the date range, the frequency, and the number of periods in the revenue schedule. These edit controls include start and end data picklists 264 and 266, a frequency picklist 268, and a Number of Periods picklist 270. Dialog 262 also includes a checkbox 272 that enables the end user to decide whether to add new records to an existing list of revenue schedule items, or whether the new records replace existing revenue schedule items with a completely new list of items.

Upon entering desired schedule information, the user activates a "Next" button 274, causing the wizard to display a second dialog 276 shown in FIG. 18B, in which the user sets all of the default values used in generating revenue schedule items. These include an accounts picklist 278, an opportunities picklist 280, a contact picklist 282, a product picklist 284, a product line picklist 286, a revenue class picklist 288, and a revenue type picklist 290.

After selecting appropriate information via these picklists, the user will activate a "Next" button 292 to advance the wizard to display a third dialog in which the user determines the pattern applied to the Quantity, Price, and Revenue fields. An exemplary pattern dialog 294 corresponding to the third dialog is shown in FIG. 18C. In pattern dialog 294, the user selects a pattern to correspond to each of Quantity, Price, and Revenue by activating Quantity, Price, and Revenue radio buttons 296, 298, and 300, and then selecting a pattern from among a straight line pattern 302, an increasing pattern 304, a decreasing pattern 306, a marginal returns pattern 308, and exponential pattern 310, and a stepped pattern 312. The default pattern is the straight line pattern. The percentages picklists 314 shown with each of the other patterns enables the user to adjust the starting price, quantity, or revenue over the number of periods or period of time specified above.

Upon completing dialog 294, the user activates a "Next" button 316 to advance the wizard to a fourth and last dialog 318, as shown in FIG. 18D. The user may fill in either the top three fields 320 or the bottom three fields 322 on dialog 318 with appropriate data. Upon activation of a "Finish" button 324, the system will automatically calculate appropriate monthly or quarterly or annual values, based on the amounts the user has filled in, the number of periods, and the pattern applied.

Figure 19:
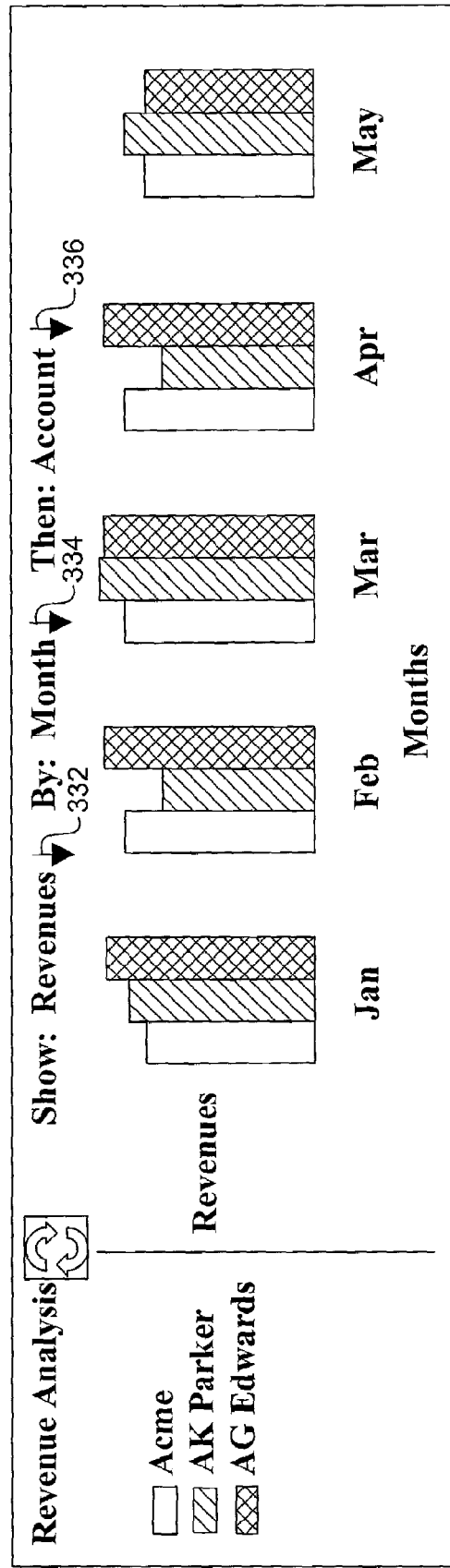
FIG. 19 is a representation of an exemplary user interface that enables users to perform a revenue analysis.

Another set of views available to the user concern Revenue Analysis. These views include My Revenues, My Team's Revenues, All Revenues. The My Revenues list will show those revenue schedule items for which a user is listed as the Sales Rep. The My Team's Revenues will show those revenue schedule items for which a user's subordinates are listed as the Sales Reps. An exemplary Revenue Analysis view 326 is shown in FIG. 19, including a Revenue List form 328 and a Revenue Analysis Graph applet 330.

The fields in Revenue List form 328 include Flag, Summary, Date, Forecast, Commit, Account, Opportunity, Opportunity Sales Stage, Product, Product Line, Description, Quantity, Price, Revenue, Cost, Margin, Upside, Downside, Revenue Class, Revenue Type, Probability, Expected Value, Sales Rep, Comments, Contact, Service Request, Campaign, Project, Partner, or Agreement. Several of these fields are not shown in FIG. 19 due to space constraints.

The "Flag" field on this view enables users to decide whether they want to show "Flagged" opportunity revenue schedule lines (those lines that were hidden from the end user on the Opportunity Revenue Schedule window) or non-hidden revenue schedule amounts (those shown on the Revenue Schedule window) or all of their revenue schedule amounts at the same time (hidden and non-hidden). The "Expected Value" field will be calculated for the user as follows: Expected Value=Probability*Revenue. The "Margin" field will be calculated as Revenue−Cost. Both fields may be overwritten by the user.

Standard queries for the Revenue List views include "All Revenues", "Forecasted Revenues", and "Committed Revenues". Users are able to query and sort the list of records in Revenue List form 328, which will cause the chart in Revenue Analysis Graph applet 330 to change appropriately. Users are also able to add new items to Revenue List form 328, simply by creating a new record and relating it to the appropriate Product, Account, Opportunity, etc.

Activation of a "Show" drop down control 332 enables users to select amongst a variety of choices, including "Revenue", "Upside", "Downside", "Quantity", "Price", "Cost", and "Margin". An optional "By" drop down control 334 enables users to toggle through a list of choices that enable them to show their data by Week, Month, Quarter, Year, Calendar Week, Calendar Month, Calendar Quarter, and Calendar Year. An optional "Then" drop down control 336 enables users to toggle through a list of choices that enable them to show information by Account, Opportunity, Oppty Sales Stage, Product, Product Line, Description, Revenue Class 1, Revenue Class 2, Probability, Sales Rep, Contact, Service Request, Campaign, Project, Partner, or Agreement. Drilling down on any of the bars in the graph and then toggling back to the list view will show just those line items applicable to the drilled down area of the graph.

Forecasting

The invention provides enhanced forecasting and management features not found in conventional systems. The system provides users with the option of using a default set of forecast series, or of creating their own forecast series using a set of administrative screens. While administrators are able to setup entirely new forecast series using administrative screens, managers and executives will be able to quickly drill down into a forecast or summarize it along new lines at the click of a mouse.

Sales representatives and managers are presented with a different set of forms than Administrators. For example, as shown in FIG. 20, a sales representative can view his or her forecasts to date in a Sales Rep Forecast view 408, which includes a Forecast List form 410 and a Forecast Header form 412. Forecast List from 410 also includes a Rep's Division, Position, and Position Type field (each of these applies to the sales rep, at the time of creating the forecast) in addition to the fields shown in FIG. 20.

The name of the forecast series for which the user would like to create a forecast is selected from a picklist 414. Once the user picks a series name, the date will be automatically filled in for them in a picklist 216—it will be the next forecast date for this series. Should the user wish to select a different date instead, the picklist will show a list of all the valid forecast dates for this series.

The forecaster for the series is displayed in a box 418. The value is automatically defaulted to the userID of the user creating the forecast record. The value is also Read only on the My Forecasts view, and a picklist on the My Team's Forecasts view and the All Forecasts views. The Series Name, Date, and Forecaster form the unique key for a forecast.

The status of the forecast is selected from a picklist 420. The status value is initially set to "Active", and can be changed to "Submitted" by the user. The status can be Unsubmitted (set back to Active) on the My Team's Forecasts, All Forecasts, and All Forecasts across Organizations views. The amount of revenue for the forecast is entered in an edit box 422, while division, position, and position type information is entered in edit boxes 424, 426, and 428. The date on which the forecast is created automatically entered in an edit box 430, while the userID of the user who created the forecast is automatically entered in an edit box 432. Similarly, the date on which a forecast is submitted is automatically entered in an edit box 434, while the userID of the submitter is automatically entered in an edit box 436.

When the user creates a new forecast and selects a forecast series, the system automatically fills in the next logical forecast date. The user may change the forecast date or leave it alone. Managers and system administrators will be able to fill in the name of the person that they are forecasting for. When the user steps off a record, the system will copy in all of their revenue schedule lines, applying the appropriate query for the specified forecast series.

The user can view the details of a given forecast by selecting a forecast details menu option, which will launch a Forecast Header form 438 and a Forecast Line Item Details form 440, as shown in FIG. 21. Forecast Header form 438 displays static and summary information concerning the forecast a user is currently working with, while details of that forecast are shown in Forecast Line Item Details form 440.

The fields in Forecast Line Item Details form 440 include Date, Forecast, Commit, Account, Opportunity, Oppty Sales Stage, Product, Product Line, Description, Quantity, Price, Revenue, Cost, Margin, Upside, Downside, Revenue Class, Revenue Type, Probability, Expected Value, Sales Rep, Comments, Contact, Service Request, Campaign, Project, Partner, or Agreement. Several of these fields are not shown in FIG. 21 due to space constraints.

In one embodiment, several key fields in the Forecast Line Item Details form, such as Account, Opportunity, Product, Product Line, Contact, Service Request, Campaign, Project, Partner, and Agreement, are not modifiable (i.e., read-only) and will include a hyperlink. The Account hyperlink will take the user to the Account Revenue Schedule window for that account, with all of the revenue schedule lines for that account shown and the cursor on the line that the user drilled down from. A show combo-box 442 is provided to enable users to show just a select group of revenue line items.

In addition to the tabular view for Opportunity Revenue form 414, revenue data may be presented in edited in a "spreadsheet" view. The spreadsheet view allows the user to enter and edit data more easily if the detail records share the same static data (and can share the same parent Forecast Item) but are spread out across many dates. In the list view (Forecast Details View), the user would have to create as many rows as records. In the spreadsheet view, the user creates one row, and enters the values into the corresponding date columns (assuming the columns exist, otherwise the user must do an 'Add Column' operation).

The spreadsheet view treats the Forecast Details as entries in a <Forecast Item, Date> grid. To the user, this appears as a spreadsheet with the row headers being static data from the parent Forecast Item, and the column headers being <date> or <date, subcolumn> if multiple subcolumns are defined in the configuration.

Using the Forecast Item to derive static data implies that each record's static data is unique across the Forecast Items visible to the user. For example, it would be confusing to see two rows with the same Opportunity, Account and Product with different Revenue values, in different columns. This assumption depends upon a similar relationship being maintained in Revenues: that the static data in a revenue is unique for that revenues' [Dynamic Group Number]. The Dynamic Group Number is stored in the Forecast Item's [Forecast Item Number]. When Revenues are added to a Forecast, the Forecast Engine searches if that Dynamic Group Number already exists in the Forecast Items. If not, it creates a new Forecast Item and creates a child Forecast Item Detail copying the Revenue's numerical values. Hence, if more than one Revenue has the same static data, but different Dynamic Group Number, it will have the confusing visual effect above. This can happen when the user creates Revenues in the List view which contain the same static values, as each new record in the List view gets its own Dynamic Group Number. For revenues to share the same dynamic group number, the user must use the Spreadsheet View.

Figure 22:
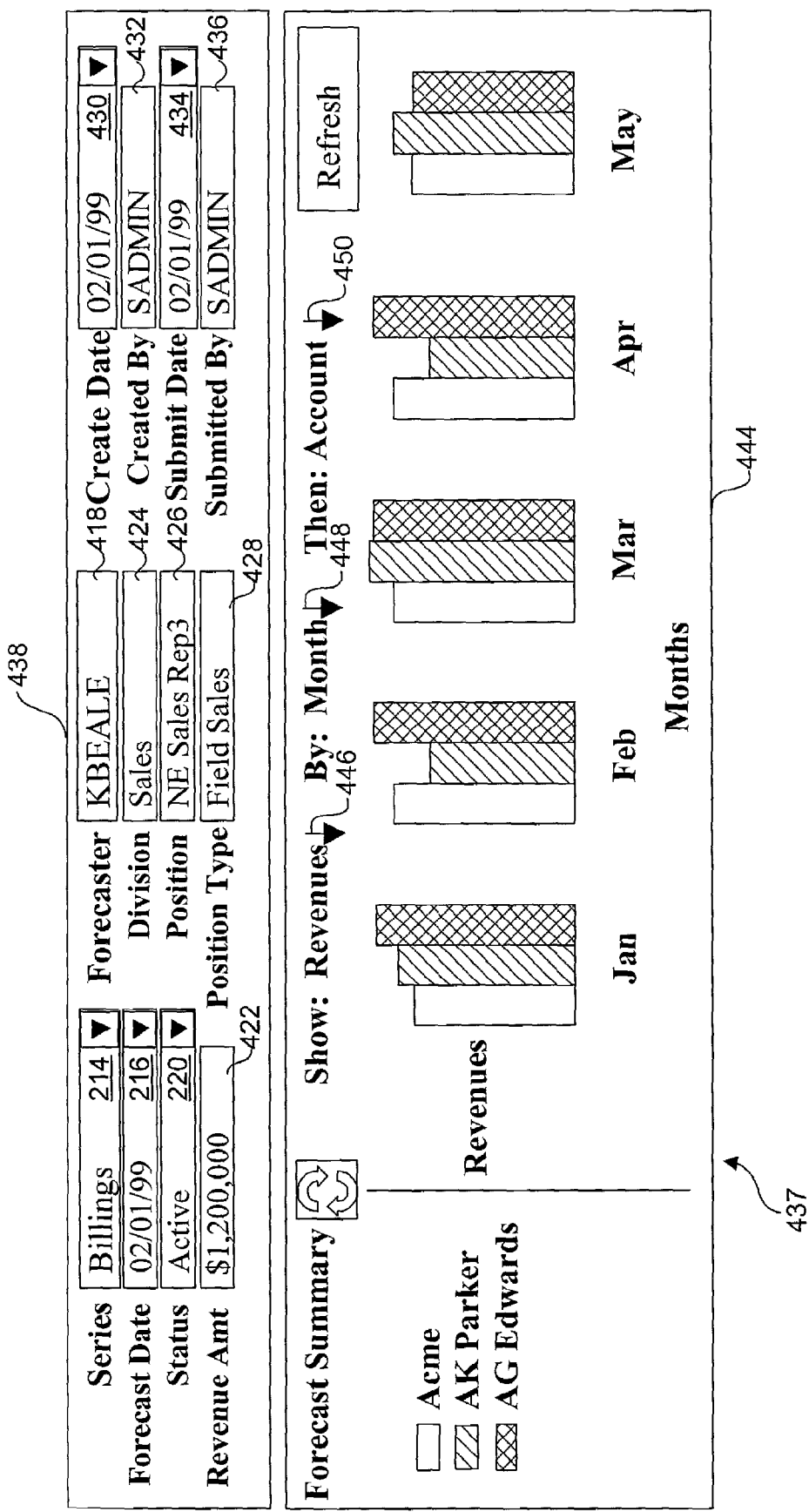
FIG. 22 is a representation of an exemplary user interface that enables users to view forecast revenue summary data in a chart form.

Activation of a Forecast Summary menu option will display charted summary information in the lower pane in a Forecast Summary view 437, as shown in FIG. 22, which includes Forecast Header form 438 and a Forecast Summary Graph applet 444. A "Show" drop down control 446 enables users to select amongst a variety of choices, including: "Revenue", "Upside", "Downside", "Quantity", "Price", "Cost", and "Margin". An optional "By" drop down control 448 enables users to toggle through a list of choices, showing their data by Week, Month, Quarter, Year, Calendar Week, Calendar Month, Calendar Quarter, and Calendar Year. A "Then" drop down control 450 enables users to toggle through a list of choices, showing the information by Account, Opportunity, Oppty Sales Stage, Product, Product Line, Description, Revenue Class 1, Revenue Type, Probability, Credit Receiver, Contact, Service Request, Campaign, Project, Partner, or Agreement. Drilling down on any of the bars in the graph and then toggling back to the list view will show just those line items applicable to the drilled down area of the graph.

Figure 23:
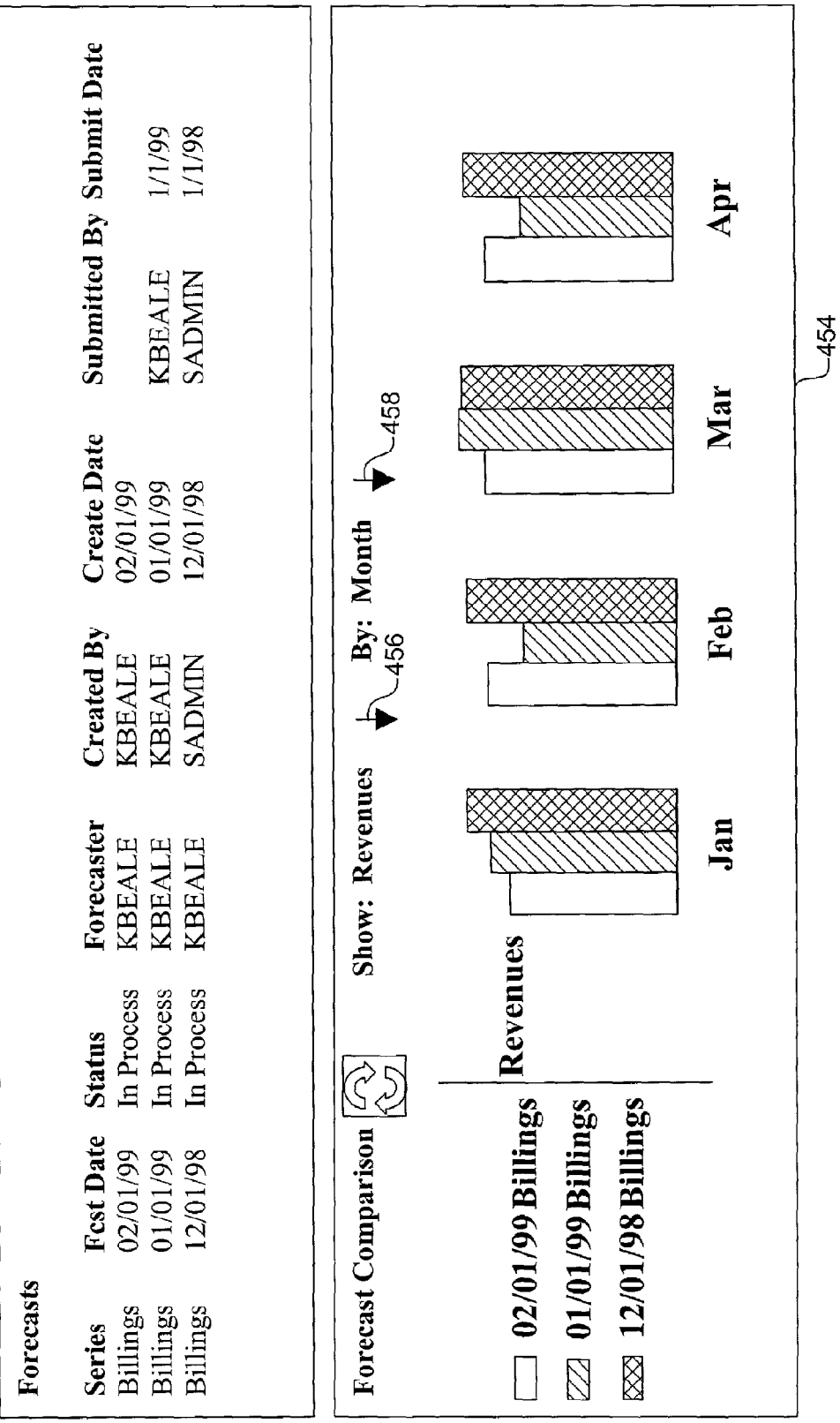
FIG. 23 is a representation of an exemplary user interface that enables users to compare forecasts against actual revenue.

Users are also enabled to compare forecast side by side in a graphic format. Selection of a Forecast Comparisons menu option displays a Forecast form 452 and a Forecast Comparison Graph applet 454, as shown in FIG. 23. In addition to the fields shown, Forecast form 452 further includes a Rep's Division, a Position, and a Position Type field, which are not shown due to space constraints.

The user will add forecasts to Forecast form 252 via a "New Record" command. They'll be able to select which forecasts they would like to add from a pick list, selecting as many records as they wish at a time. The pick list will contain all of the columns shown and described above, so that users can search for a forecast by the userID of the person who created it, their position at the time of creating the forecast, their division at the time, etc. The chart in Forecast Comparison Graph applet 454 will then show the forecasts side by side, enabling the user to view differences in Revenues, Margins, Upside, Downside, etc.

A "Show" drop down control 456 enables users to select amongst a variety of choices, including: "Revenue", "Upside", "Downside", "Quantity", "Price", "Cost", and "Margin", at the time of creating the forecast. A "By" drop down control 458 enables users to toggle through a list of choices, showing their data by Week, Month, Quarter, Year, Calendar Week, Calendar Month, Calendar Quarter, and Calendar Year.

As discussed above, an important aspect of the invention concerns its ability to generate forecast data corresponding to a organization hierarchy, such that forecast data may be aggregated by individual employee, sales group, sales region, etc., all the way up to the top of an organization's hierarchy. For example, from an Explorer Summary view 460 shown in FIG. 24, a user can view summary information at a variety of different levels via an intuitive user interface that pictorially illustrates organization hierarchy information.

Explorer Summary view 460 includes a Organization Explorer form 462, an Employee form 464 and a Forecast Summary Graph applet 466. Forecast Summary form 466 includes a "Show" drop down control 468, a "By" drop down control 470, and a "Then" drop down control 472, each of which functions in a similar manner to that described above with reference to Forecast Summary Graph applet 444.

Organization Explorer form 462 displays a hierarchical configuration of a user's organization, based on visibility rules that enable a user to view his or her forecast, and the forecast of others who are "visible" to the user. In one embodiment, the visibility rules enable a user to view his or her forecasts and the forecasts of any member of the organization who is subordinate to the user.

The Explorer View will show all of the employees reporting directly to the user, and the subordinates of those employees, as well. For instance, in the hierarchy shown in FIG. 24, the user, Walter Davis, is a vice president of sales who has two employees who directly report to him: Susan Miller, and Kim Beale, both of who are regional managers. Each of Ms. Miller and Ms. Beale in turn have two subordinates who report to them.

The forecast data, which are displayed in Forecast Summary Graph applet 466, correspond to the employee selected in Organization Explorer form 262. Initially, the user's name will be highlighted and the forecast summary for the user and all of the user's subordinates will be shown in Forecast Summary Graph applet 466. Selecting one of the other employees in the hierarchy will cause the values in Forecast Summary Graph applet 466 to reflect the forecast for that person and their direct reports (if any exist).

Figure 24:
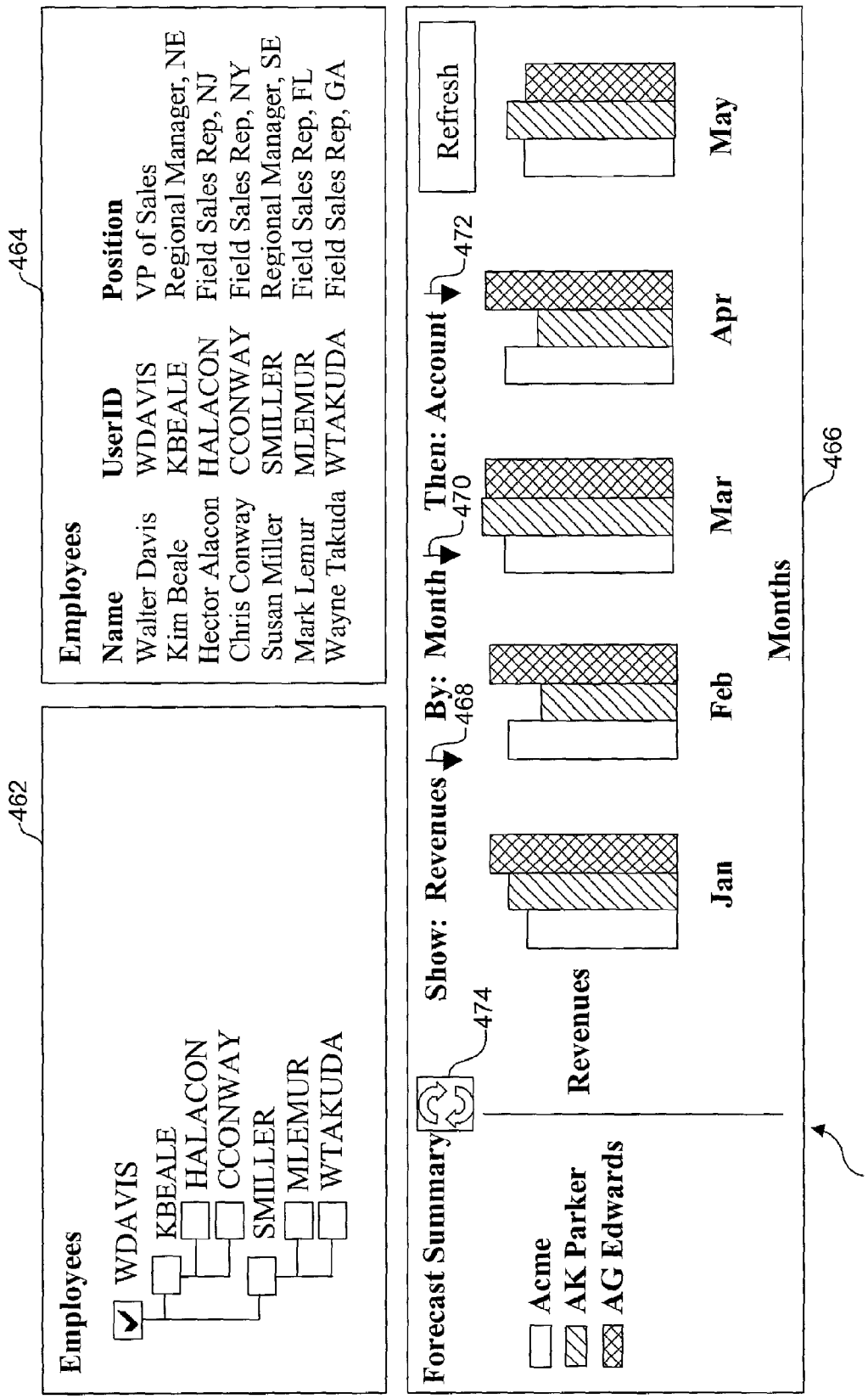
FIG. 24 is a representation of an exemplary user interface that enables a manager to view various summary forecast data corresponding to the manager's forecast and forecasts for subordinates of the manager.

The user will be able to activate a toggle control 474 to toggle the view between the chart view shown in FIG. 24 to a Forecast Line Item Details form 476 shown in FIG. 25, in a manner similar to other forecast screens discussed above. The user may also change the way the data are displayed by choosing appropriate values from drop down controls 468, 470, and 472.

As shown in FIG. 25, the user may view how their forecast is broken out amongst their subordinate employees, along with the details of each employee's forecast. In this view, Organization Explorer form 462 and Employees form 464 function in substantially the same manner as discussed above. Forecast Line Item Detail form 476 functions in a similar manner to the forecast detail views discussed above, except that the records shown in this view will change based on the employee (e.g., sales representative, first tier manager, second tier manager, etc.) selected in organization explorer pane 462. Initially, the user's name will be highlighted and all of the forecast line items for the user and all of their subordinates will be shown in forecast detail view 476. Selecting one of the other employees will cause the list of detail records to change to just that person and their direct reports (if any exist). Should the user wish to adjust the forecast information shown, add adjustment lines, etc. they will be able to do so as well.

Two revenue analysis reports, called Revenue Analysis Summary and Revenue Analysis Details, are also available to users to analyze forecast data. An exemplary Revenue Analysis Summary report 478 corresponding to the forecast data shown in FIG. 19 is shown in FIG. 26. An exemplary Revenue Analysis Detail report 480 corresponding to the same forecast data is shown in FIG. 27. The Revenue Analysis Summary report shows a "snapshot" of what the user sees in the corresponding Revenue Analysis graph, while the Revenue Analysis Details report shows every Revenue Schedule line that appears in the Revenues view, summarized and grouped just like the Summary Analysis Report, according to the user's preferences in the Revenue Analysis graph.

In one embodiment, the various system data are stored in a database comprising a plurality of tables. Typically, the database will comprise a SQL (structured query language) relational database management system (RDBMS) database, such one of the SQL RDBMS database products provided by Oracle (Oracle 8i, 9i), Microsoft (SQL Server 7), Sybase, IBM (DB2) or Informix. Optionally, the database may comprise a non-SQL-based server product, such as the Microsoft's Access database or Paradox. In an optional configuration, the system data are stored in an enterprise data system that includes an object manager and data manager that abstracts how data are stored in a backend database from clients connected to the enterprise data system, and enable clients to store and retrieve data from the database through use of business object requests made by clients.

ER Diagram and Physical Model

Figure 28A:
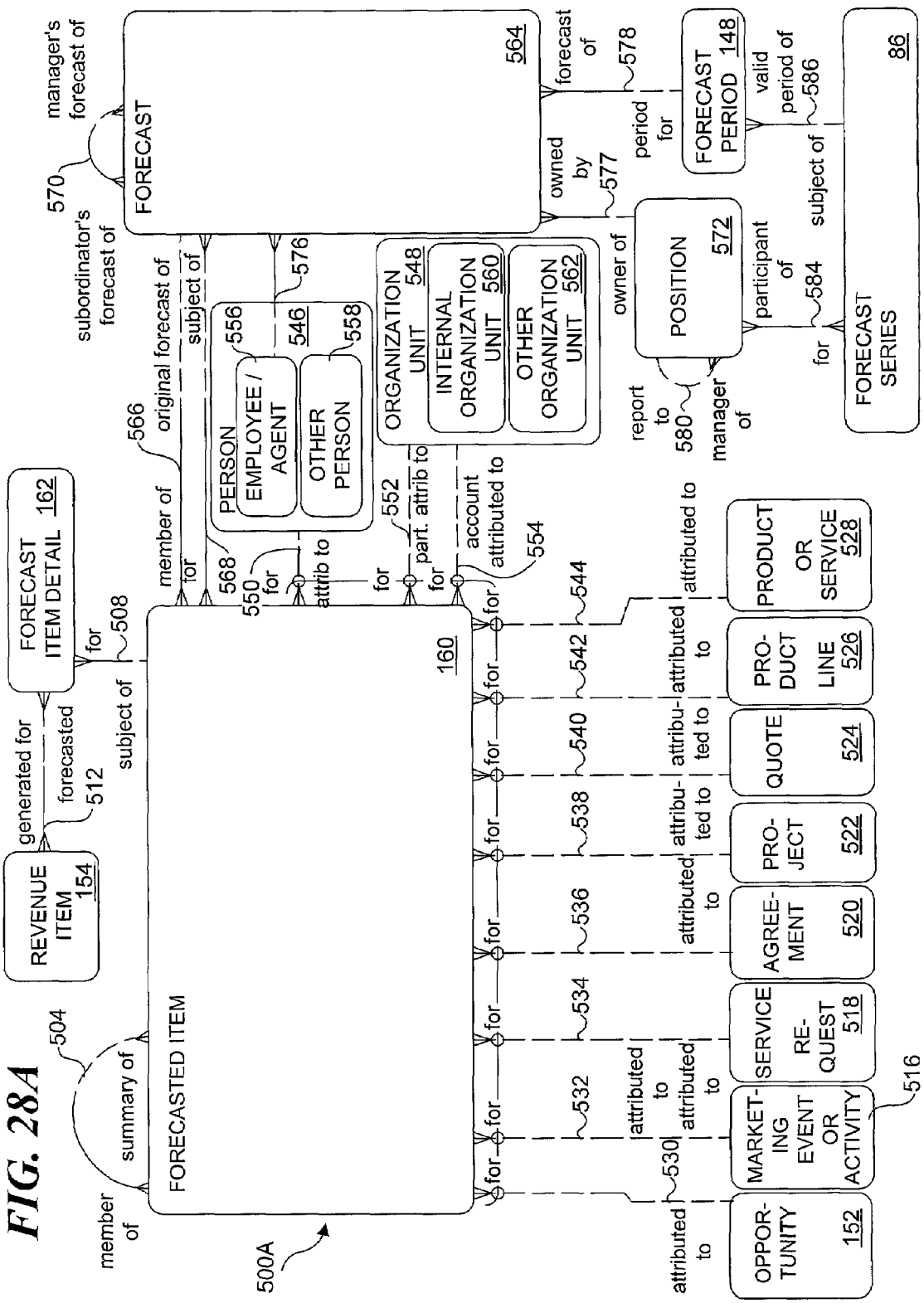
FIGS. 28A and 28B collectively comprise an entity relationship (ER) diagram corresponding to an exemplary scheme for storing data that is used by the system of the invention.
Figure 28B:
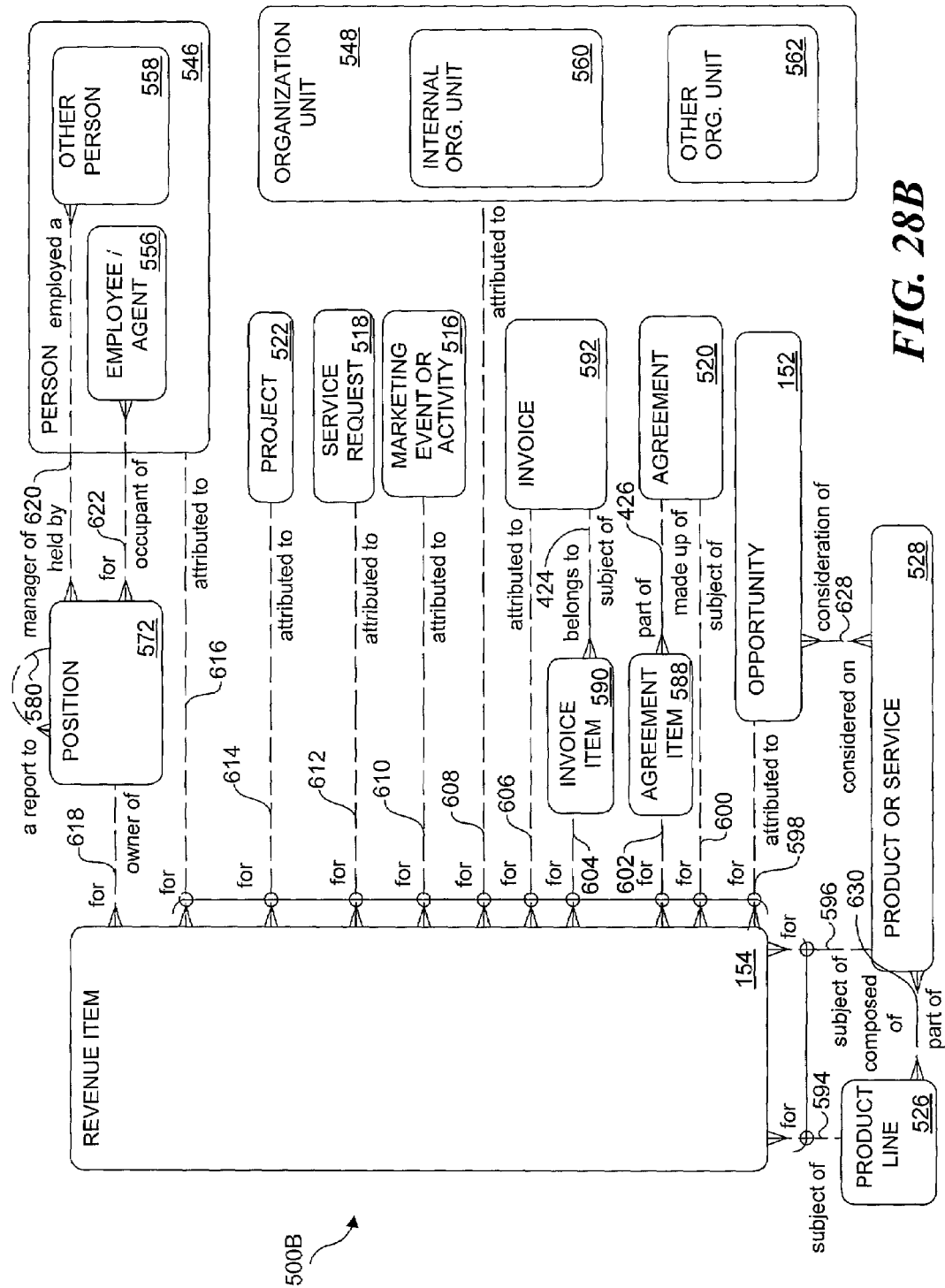

An entity relationship (ER) diagram 500 (shown as 500A and 500B) corresponding to one embodiment of a database in which the system data may be stored is shown in FIGS. 28A and 28B. ER Diagram 500 includes a Forecast Item entity 160 that has a many-to-many self-referencing (recursive) relationship 504. Forecast Item entity 160 is linked to a forecast item detail entity 162 via a one-to-many relationship 508. In turn, Forecast Item Detail entity 162 is linked to a Revenue Item entity 154 via a many-to-many relationship 512.

Forecast Item entity 160 occupies the center of a star schema in which the entity functions as a "fact" table, and the related entities hold "dimension" data. The related entities include an Opportunity entity 152, a Marketing Event or Activity entity 516, a Service Request entity 518, an Agreement entity 520, a Project entity 522, a Quote entity 524, a Product Line entity 526, and a Product or Service entity 528. The related tables are all linked to Forecast Item entity 160 via many-to-one relationships 530, 532, 534, 536, 538, 540, 542, and 544.

Forecast Item entity 160 is also related to two supertype entities, including a Person supertype entity 546 and an Organization Unit supertype entity 548, via many-to-one relationships 550, 552, and 554. Person supertype entity 546 includes an Employee/Agent subtype entity 556 and an Other Person subtype entity 558. Organization Unit supertype entity 548 includes an Internal Organization Unit subtype entity 560 and an Other Organization Unit subtype entity 562.

Forecast Item entity 160 is also linked to a Forecast entity 564 via a many-to-one relationship 566 and a many-to-many relationship 568. Forecast entity 564, which includes a many-to-many self-referencing (recursive) relationship 570, is linked to Employee/Agent subtype entity 556, a Position entity 572, and a Forecast Period entity 148 via many-to-one relationships 576, 577 and 578, respectively. Position entity 572 includes a self-referencing many-to-one relationship 580 and is linked to a Forecast Series entity 86 via a many-to-many relationship 584. Forecast Period entity 148 is likewise linked to Forecast Series entity 86 via a many-to-one relationship 586.

Further details of ER Diagram 500 (500B) are shown in FIG. 28B. As shown, Revenue Item entity 154 is at the center of a second star schema in which it is linked to a plurality of dimension table entities including Product line table 526, Product or Service entity 528, Opportunity entity 152, Agreement entity 520, an Agreement Item entity 588, an Invoice Item entity 590, an Invoice entity 592, Organization Unit supertype entity 548, Marketing Event or Activity entity 516, Service Request entity 518, Project entity 522, and Person supertype entity 546 via respective many-to-one relationships 594, 596, 598, 600, 602, 604, 606, 608, 610, 612, 614, and 616. Revenue Item entity 154 is also linked to Position entity 572 via a many-to-one link 618.

Position entity 572 is further linked to Other person subtype entity 558 and Employee/Agent subtype entity 556 via many-to-many relationships 620 and 622, respectively. Invoice Item entity 590 is linked to Invoice entity 592 via a many-to-one relationship 624, while Agreement Item entity 588 is linked to Agreement entity 620 via a many-to-one relationship 626. Further relationships include a many-to-many relationship 628 linking Opportunity entity 152 to Product or Service entity 528, and a many-to-many relationship 630 linking Product or Service entity 528 to Product line entity 526.

Figure 29A:
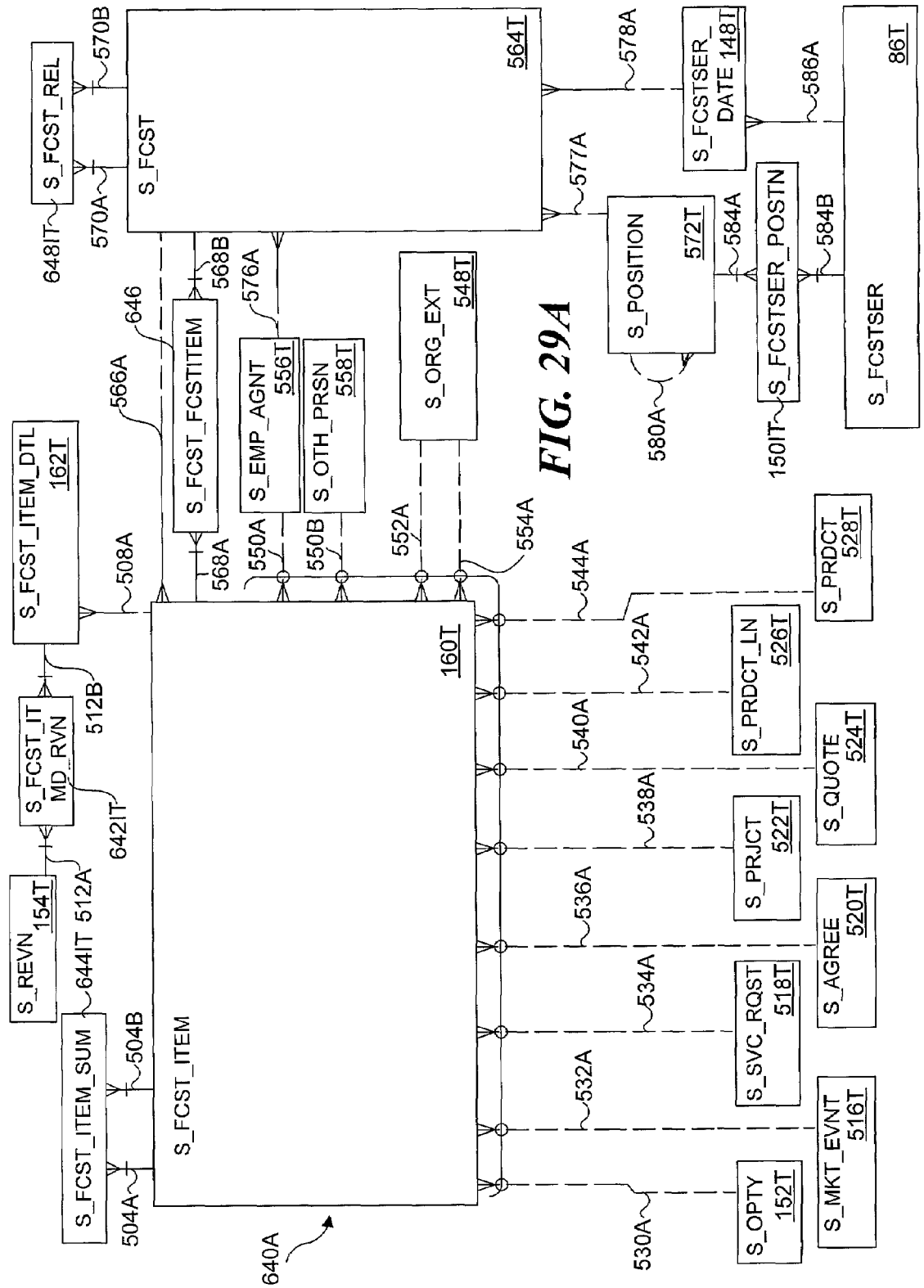
FIGS. 29A and 29B collectively comprise a physical database model corresponding to the ER diagram of FIGS. 28A and 28B.
Figure 29B:
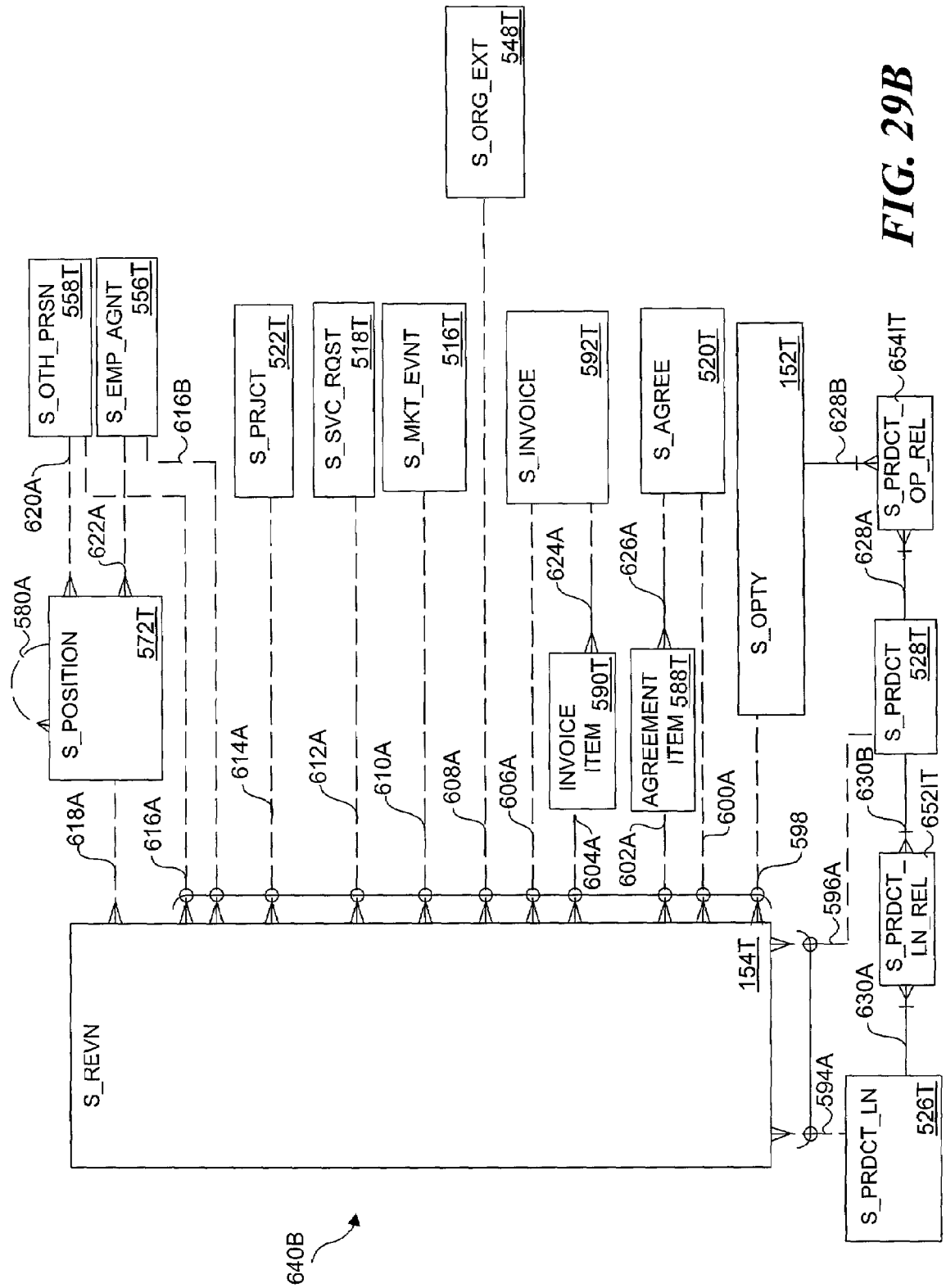

A physical model (i.e., database server schema) 640 (640A and 640B) corresponding to ER diagram 500 is shown in FIGS. 29A and 29B. In Physical model 640, tables that are derived from entities in ER Diagram 500 share the same root reference number with an appended "T." For example, S_FCST_ITEM table 160T is derived from Forecast Item entity 160. Similarly, relationships in physical model 640 including an appended "A" are derived by relationships in ER Diagram 500 having a common root reference number.

In cases where many-to-many relationships exist in the ER Diagram, respective intersection tables are provided in physical model 640, with many-to-one relationships from the new intersection table to the tables that are derived from the original entity or entities that have many-to-many relationships in ER Diagram 500. In this case, the new many-to-one relationships share the same root reference number of the many-to-many relationship from which they are derived, and have an appended "A" and an appended "B". For instance, in ER Diagram 500 there is a many-to-many relationship 512 between Revenue Item entity 154 and Forecast Item Detail entity 162. The corresponding objects in physical model 640 include base tables S_REV_ITEM 154T and S_FCST_ITEM_DTL 162T, each of which include a one-to-many relationship (312A, 312B) with an intersection table S_FCST_ITMD_RVN 642IT. Additional intersection tables include an S_FCST_ITEM_SUM table 644IT, an S_FCST_FCSTITEM table 646IT, an S_FCST_REL table 648IT, S_FCSTSER_POSTN intersection table 150IT, an S_PRDCT_LN_REL table 652IT, and an S_PRDCT_OP_REL table 654IT.

Exemplary Schema Portion with Data

Figure 30:
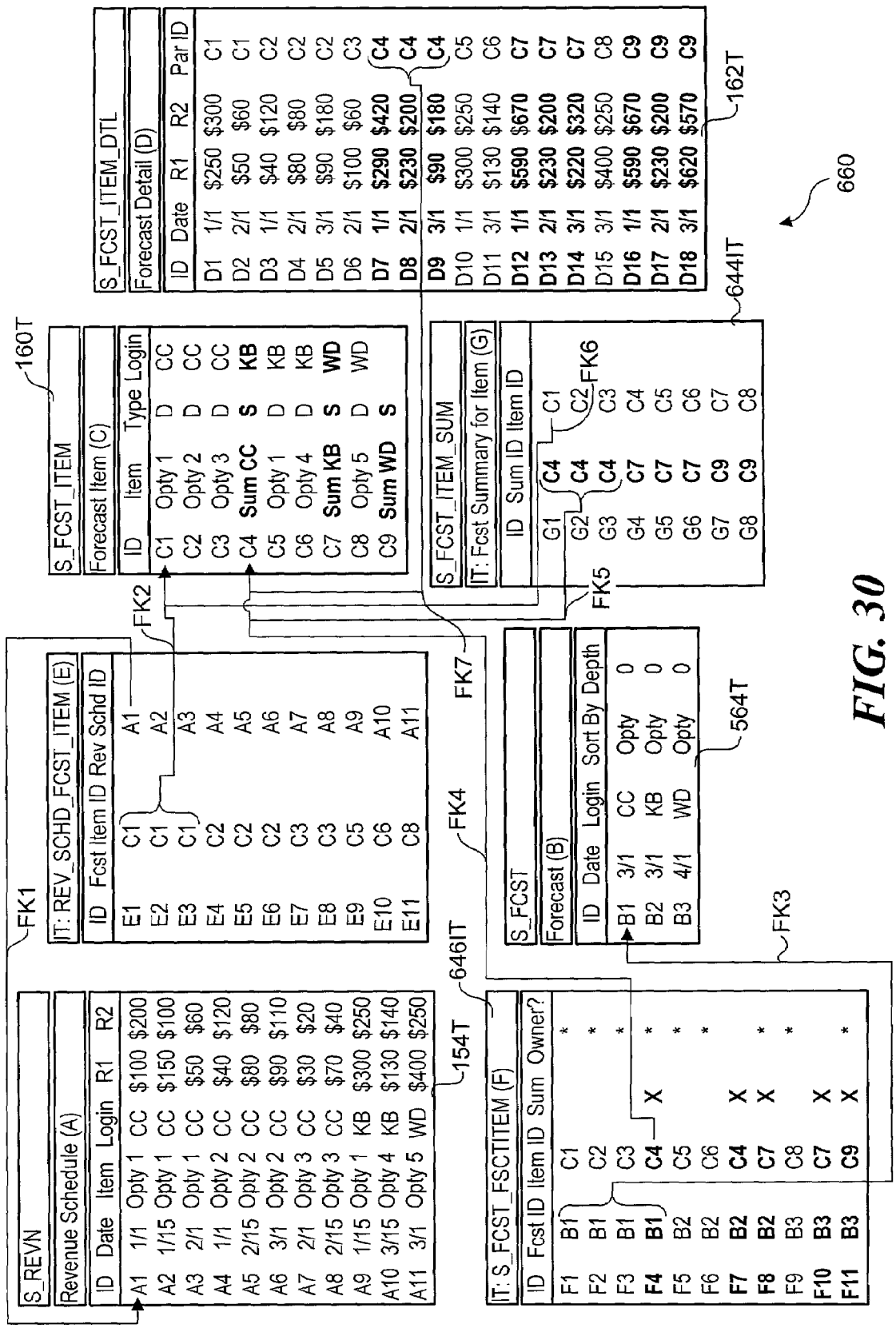
FIG. 30 is a schema diagram illustrating exemplary data stored in a portion of the tables defined by the physical database model of FIGS. 28A and 28B.

A portion of exemplary database schema 660 corresponding to physical model 640 is shown in FIG. 30. Schema 660 includes S_REVN table 154T, a Rev_Schd_Fcst_Item intersection table 662IT, S_FCST_FSCTITEM intersection table 646IT, S_FCST table 564T, S_FCST_ITEM table 160T, S_FCST_ITEM_SUM intersection table 655IT, and S_FCST_ITEM_DTL table 162T. Some of the tables also include a descriptive name corresponding to the data contained therein, such as Revenue Schedule, Forecast Item, etc.

Each table includes an "ID" primary key column. Each tables also includes an alphabetically identifier in parenthesis (e.g., (A), (B), etc.), which comprises a prefix for the data contained in the primary key ("ID") column of that table. For example, the primary key column of S_REVN table 154T contains values including A1, A2, . . . A11.

All of the tables have at least one foreign key column through which the table is linked (defined by a relational constraint) to another table via that table's primary key ("ID) column, except for S_FCST table 564. Various relational constraints between the tables are defined as follows. A "Rev Schd ID" column in REV_SCHD_FCST_ITEM intersection table 662IT is linked to the "ID" column of S_REVN table 154T via a foreign key constraint FK1. A "Fcst Item ID" column in REV_SCHD_FCST_ITEM intersection table 662IT is linked to the "ID" column of S_FCST_ITEM table 160T via a foreign key constraint FK2. A "Fcst ID" column in S_FCST_FSCTITEM intersection table 646IT is linked to the "ID" column of S_FCST table 564T via a foreign key constraint FK3. An "Item ID" column in S_FCST_FSC-TITEM intersection table 646IT is linked to the "ID" column of S_FCST_ITEM table 160T via a foreign key constraint FK4. "Sum ID" and "Item ID" columns in S_FCST_FSC-TITEM intersection table 646IT are linked to the "ID" column of S_FCST_ITEM table 160T via respective foreign key constraints FK5 and FK6. Finally, a "Par ID" column in S_FCST_ITEM_DTL table 162T is linked to the "ID" column of S_FCST_ITEM table 160T via a foreign key constraint FK7.

Figure 31:
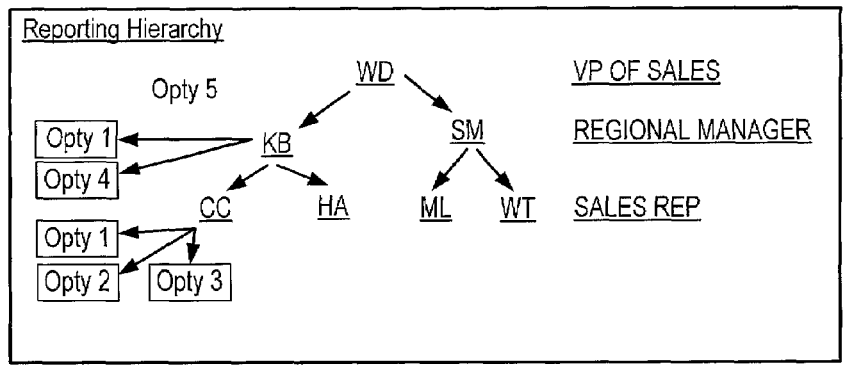
FIG. 31 is a schematic diagram illustrating an exemplary organization hierarchy and an exemplary set of opportunities created by members of the hierarchy that corresponds to the data stored in the schema diagram of FIG. 30.

The various data shown in schema 660 pertain to an exemplary reporting hierarchy shown in FIG. 31, wherein the people in the hierarchy are the same as those shown in FIGS. 24 and 25; in FIG. 31, these people are referred to by their initials, e.g., WD for Walter Davis, etc. These initials are used to identify each user's information in schema 660, under the "Login" columns in S_REVN table 154T, S_FCST table 564T, and S_FCST_ITEM table 160T.

The various bolded values in schema 660 represent summary values. Note that S_FCST_ITEM table 160T and S_FC-ST_ITEM_DTL table 162T contain a mix of detail and summary values, while other tables (e.g., S_REVN table 154T) include only detail values. By storing data in this manner, many of the various user interfaces discussed above are enabled to include both detail and summary values in the same form.

System Architectures

The present invention may be implemented using various architecture schemes, including a "zero footprint" architecture, a client-server architecture, and a "mobile web client" architecture. Notably, the software components that are used for each of these different architectures perform substantially the same functions in each architecture—only the location of the software components are changed.

Figure 32:
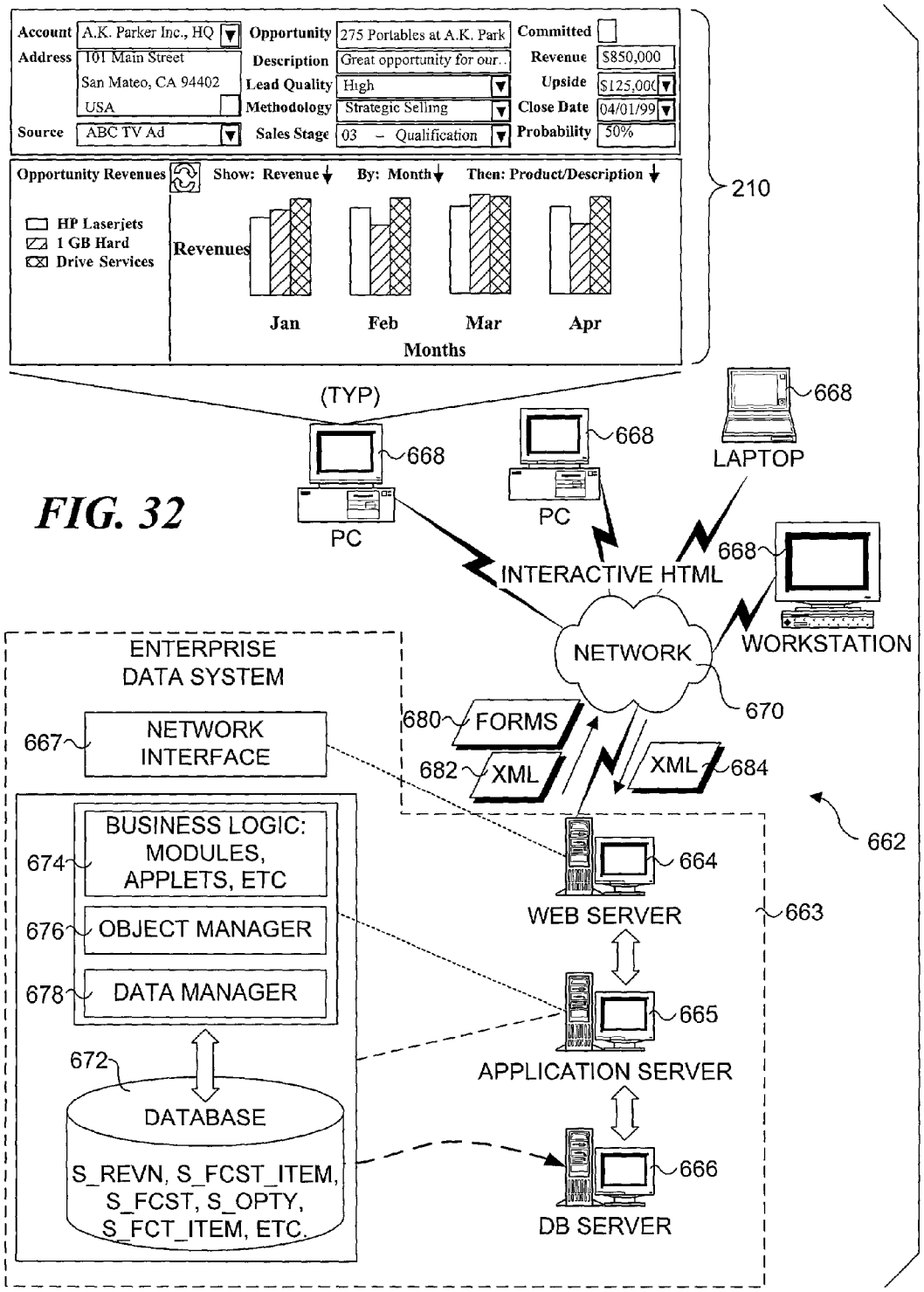
FIG. 32 an a schematic diagram illustrating a "zero footprint" architecture in which data are accessed via an enterprise server and none of the software components in accordance with the invention are stored on clients.

An exemplary "zero footprint" architecture 662 is shown in FIG. 32. The reason this architecture is referred to a "zero footprint" is because there is no software component corresponding to the forecast and revenue management system that resides on the clients (except for an operating system and client browser software). Zero-footprint architecture 662 includes an enterprise data system 663, including a web server 664, an application server 665, and a database server 666.

The web server provides a network interface 667 that is used to handle network bi-directional network communications with various clients 668, including personal computers (PCs), laptop computers, and workstations, all of which are enabled to access the enterprise data system via a network 670 and the web server. Various business logic software components 674 are run application server 665 to enable and control the interaction between the clients, the forecast and revenue management software, and the data for the system, which are stored in a database 672 hosted on database server 666. In one embodiment, the application server further includes an object manager 676 and a data manager 678, which enable access to a data stored on database 672.

Typically, database 672 will comprise a SQL (structured query language) relational database management system (RDBMS) database, such as one of the SQL RDBMS database products provided by Oracle (Oracle 8i, 9i), Microsoft (SQL Server 7), Sybase, IBM (DB2) and Informix. Optionally, the enterprise database may comprise a non-SQL-based server product, such as the Microsoft's Access database or Paradox. Similarly, voice database 20 may comprise a SQL or non-SQL database. As depicted, database 672 is hosted on database server 666, which is linked in communication with application server 665. In an optional configuration, database 672 may be hosted on the same machine as application server 665.

In zero footprint architecture 662, clients 678 are enabled to access data stored in database 672 via network 670 and enterprise server 664 using interactive HTML. Each Client 678 will be running an operating system and an appropriate browser, such as Microsoft's Internet Explorer and Netscape's Navigator browsers. Accordingly, the interfaces are built using interactive HTML components including forms 680 comprising HTML embedded with various interactive objects built using interactive scripting languages, such as Javascript, VBscript, etc, which are served from web server 664 over network 670 to each client. When rendered on a client browser, each interactive HTML component provides a interactive user interface object, as exemplified by Opportunity Revenue applet 210. In one embodiment, the forms will be populated with data retrieved from database 672 and passed to the client and XML data 682. Upon receiving the incoming XML data, the interactive HTML component will parse the data and populate itself appropriately. When a user changes or adds new data, these data are passed back to the enterprise data system as XML data 684, which is received by web server 664 and passed to application server 665.

The business logic components running on application server 665 enable each client to interact with the system, including storing data in and retrieving data from database 672. For example, upon request a client request to save data, application server 665 formulates appropriate data storage requests to store current data in database 672, through use of object manager 676 and data manager 678. Object manager 668 and data manager 670 provide a layer of abstraction between an database client, such as application server 665, and data in database 672. This layer of abstraction enables the schema used for enterprise database 672 to be reconfigured while maintaining a consistent application interface to clients. Rather than accessing data through a direct query of enterprise database 672, a client requests data to be retrieved by passing information that identifies data corresponding to one or more object(s) be retrieved from the database. Upon receiving a data retrieval request, object manager 676 determines where data corresponding to the object(s) are stored in database 672, and interacts with data manager 678 to retrieve the corresponding data by formulating an appropriate database query. In an optional configuration (not shown), data may be accessed directly from database 672 using an appropriate database query language, such as SQL for SQL-based databases.

As well be recognized by those skilled in the art, enterprise data system 663 employs a three-tier architecture, including a web server tier, an application server tier, and a database "back-end" tier. Accordingly, each tier may be operated on one or more separate machines. For example, in some implementations, a plurality of application servers and/or web servers may be used. Alternatively, a two-tier or even a single tier architecture may be used. For instance, in lower throughput implementations, all of the software components described above that run on web server 664, application server 665 and database server 666 may be run on a single machine.

Figure 33:
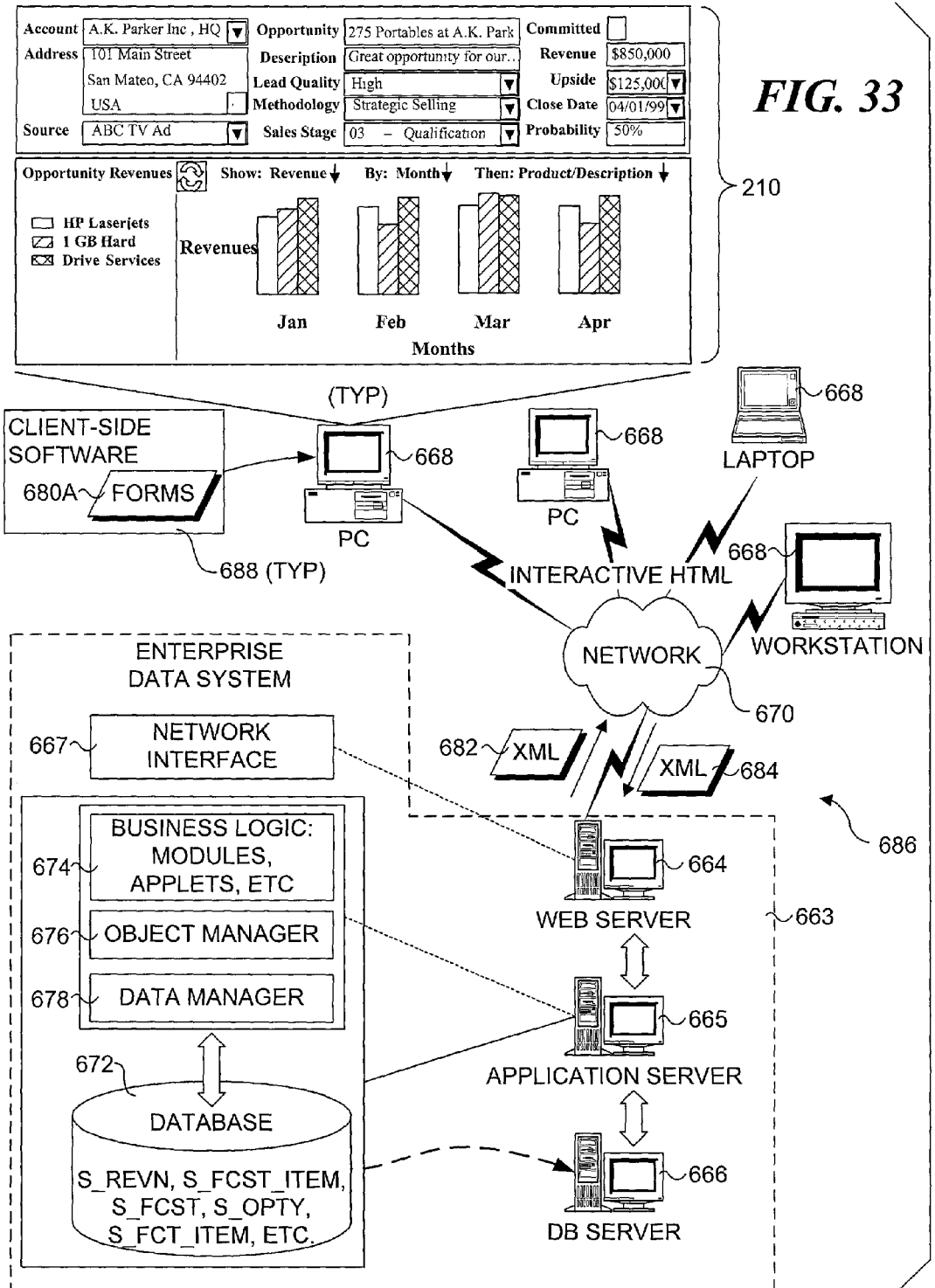
FIG. 33 is a schematic diagram illustrating a client-server architecture in which data are accessed via the enterprise server using client-side software components stored in the clients.

A second exemplary architecture comprising a client-server architecture 686 is shown in FIG. 33. In this configuration, each client includes a set of client-side software 688 including the interactive HTML components discussed above, as depicted by forms 680A. The client-side software is used to interact with software components running on the various machines in enterprise data system 663. In general, client-server architecture 686 operates in a similar manner to that discussed above with reference the zero footprint architecture, except that there no longer is the need to serve the interactive HTML components to the clients, since they are already stored on the clients.

Figure 34:
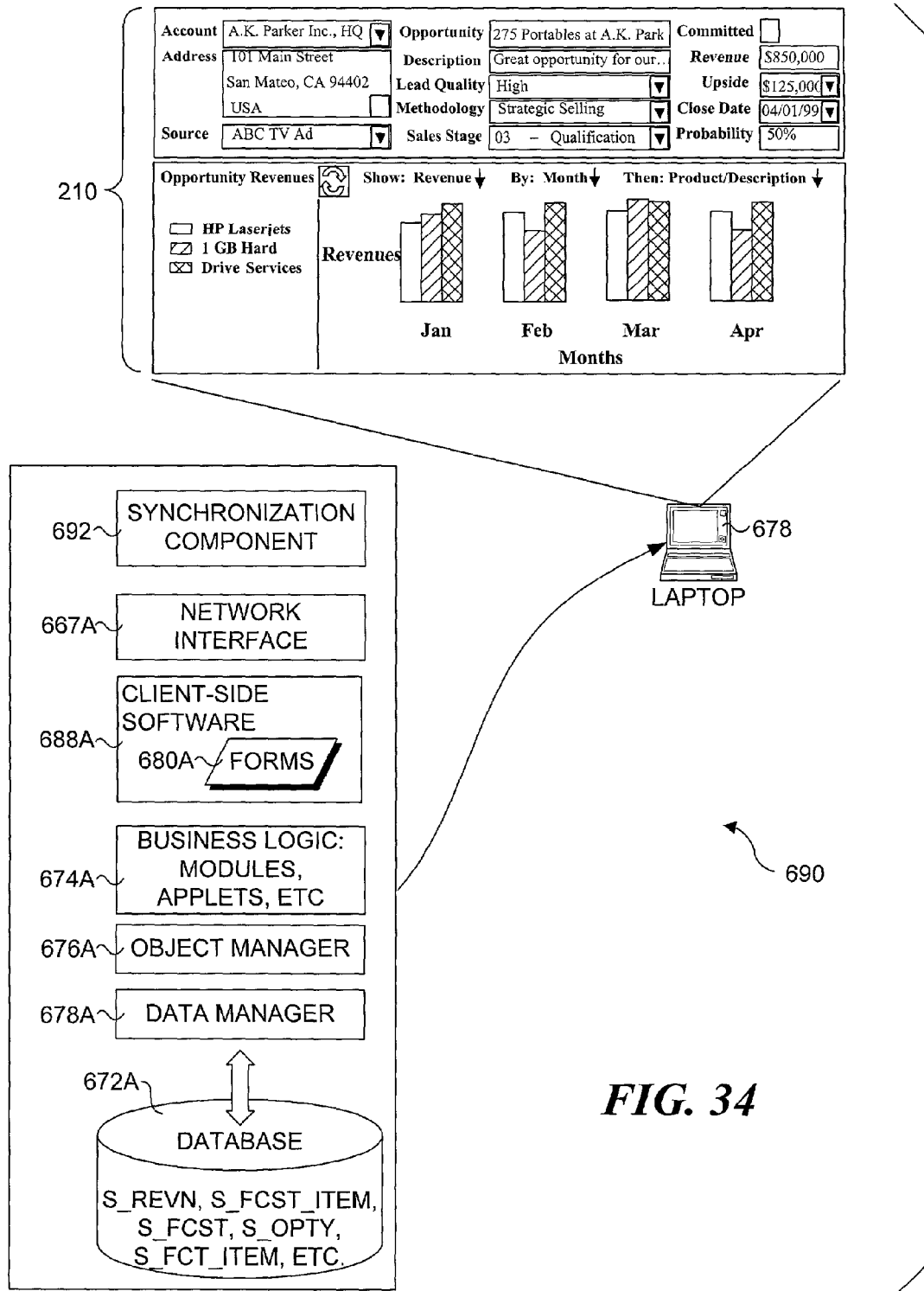
FIG. 34 is a schematic diagram of a "mobile" architecture in which all of the software components and data are stored on a client.

In a third "mobile web client" architecture 690, all of the software components reside on the client, as depicted by network interface 667A, client-side software 688A, business logic software 674A, an object manager 676A, and a data manager 678A. In this configuration, a local database 672A is maintained on the client. In the mobile web client architecture, the various software components interact with each other in a similar manner to that discussed above, including network interactions. However, in this case the "network" is internal to the client. Furthermore, any type of computer may be used for the mobile client in addition to the laptop computer depicted in FIG. 34.

In addition to the software provided by the client-side software discussed above, the software on the client includes a synchronization component 692 that enables data stored in local database 672A to be synchronized with selected data stored in database 672. For example, a user may synchronize all of the data that are visible to that user. In general, synchronizing comprises forwarding a copy of any data that are on a first computer and not on a second computer from the first computer to the second computer, while also forwarding a copy of data that are on the second computer and not on the first computer from the second computer to the first computer such that the data on both computers are synchronized (i.e., the same). It is noted that in general, the data in local database 672A will comprise a subset of the data in database 672.

Exemplary Computer System for Practicing the Invention

Figure 35:
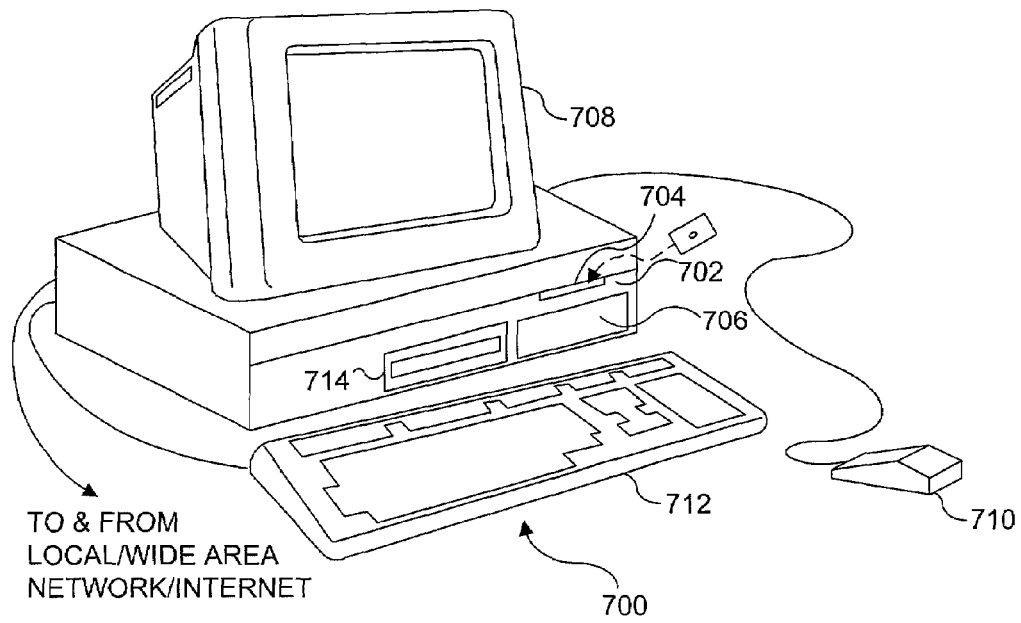
FIG. 35 is a schematic diagram illustrating the primary components of a computer system suitable for practicing the invention.

With reference to FIG. 35, a generally conventional computer 700 is illustrated, which is suitable for use in connection with practicing the present invention, and may be used for running client-side software comprising one or more software modules that implement the various functions of the invention discussed above. Examples of computers that may be suitable for clients as discussed above include PC-class systems operating the Windows NT or Windows 2000 operating systems, Sun workstations operating the UNIX-based Solaris operating system, and various computer architectures that implement LINUX operating systems. In one embodiment discussed above with respect to the user-interfaces illustrated in FIGS. 15-27, a Windows-based operating system is used. Computer 700 is also intended to encompass various server architectures as well, on which various databases may be operated, such as a SQL database that is used to store the system data. Alternatively, other similar types of computers may be used, including computers with multiple processors.

Computer 700 includes a processor chassis 702 in which are mounted a floppy disk drive 704, a hard drive 706, a motherboard populated with appropriate integrated circuits (not shown) including memory and one or more processors, and a power supply (also not shown), as are generally well known to those of ordinary skill in the art. It will be understood that hard drive 706 may comprise a single unit, or multiple hard drives, and may optionally reside outside of computer 700. A monitor 708 is included for displaying graphics and text generated by software programs and program modules that are run by the computer. A mouse 710 (or other pointing device) may be connected to a serial port (or to a bus port or USB port) on the rear of processor chassis 702, and signals from mouse 710 are conveyed to the motherboard to control a cursor on the display and to select text, menu options, and graphic components displayed on monitor 708 by software programs and modules executing on the computer. In addition, a keyboard 712 is coupled to the motherboard for user entry of text and commands that affect the running of software programs executing on the computer. Computer 700 also includes a network interface card (not shown) for connecting the computer to a computer network, such as a local area network, wide area network, or the Internet Computer 700 may also optionally include a compact disk-read only memory (CD-ROM) drive 714 into which a CD-ROM disk may be inserted so that executable files and data on the disk can be read for transfer into the memory and/or into storage on hard drive 706 of computer 700. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU. Optionally, the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A computer system comprising:
a processor;
a memory, coupled to the processor, and storing instructions executable on the processor,
the instructions comprising
a forecast series creation set of instructions, wherein
a forecast series associated with the forecast series creation set of instructions comprises a set of parameters that define attributes of forecasts that are created from the forecast series, wherein the set of parameters
identify hierarchy data defining a hierarchy structure of an organization, including data identifying a hierarchical position of each member of the organization, wherein the hierarchy structure comprises a plurality of management levels,
identify an acceptable range of dates over which forecasts generated from the forecast series cover,
identify members of the organization to be included in the forecasts generated from the forecast series, the members derived from the hierarchy,
identify forecast data to be automatically analyzed to generate forecasts from the forecast series,
identify a visibility mode for the forecasts generated from the forecast series,
are employed to generated a forecast series comprising the identity of the hierarchy data, the identity of the acceptable range of dates, the identity of the members of the organization to be included in the forecast, the identity of the forecast data to be automatically analyzed, and the identity of the visibility mode, and
are stored together with the forecast series, wherein the stored forecast series is accessible for use in generation of forecasts upon request, and the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy structure that is less than or equal to n levels below a management level occupied by the manager, and there is at least one level in the hierarchy structure that is below the last level included in the search scope, an opportunity and revenue scheduling creation set of instructions to identify forecast data, a forecast creation set of instructions that define attributes of a particular forecast, wherein the attributes fall within the set of parameters comprised in the forecast series, to generate the particular forecast, and said processor configured to generate the particular forecast using the forecast series.

2. The computer system of claim 1, wherein
the forecast series creation set of instructions further comprises instructions to
define the visibility rules that specify the forecast data that are visible to each management level of the organization to be stored on the storage device, and
include the visibility rules in the forecast series, and
the forecast creation set of instructions further comprises instructions to generate a forecast for any management level of the organization, wherein
each forecast that is generated is based on forecast data that are visible to the management level for which that forecast corresponds as specified by the visibility rules.

3. The computer system of claim 1 wherein the opportunity and revenue scheduling creation set of instructions further comprises instructions to
enable a member of the organization to submit a forecast to a superior; and
prevent the member from modifying the forecast after it has been submitted.

4. The computer system of claim 3, wherein the forecast creation set of instructions further comprises instructions to
present forecast data in a graphical format that enables a member to compare forecast data corresponding to related forecasts over time that are specified to be visible to that member.

5. The computer system of claim 1, wherein
the forecast series further comprises a field indicating whether the forecast series is available for forecasting purposes.

6. A computer system comprising:
a processor;
a memory, coupled to the processor, and storing instructions executable on the processor,
the instructions comprising
a forecast series creation set of instructions, wherein
a forecast series associated with the forecast series creation set of instructions comprises a set of parameters that define attributes of forecasts that are created from the forecast series, wherein the set of parameters
identify hierarchy data defining members of an organization and a hierarchical position of each member in a hierarchy comprising a plurality of management levels,
determine an identity of a current forecast participant who is a member of the organization,
identify members of the organization who are subordinate to the current forecast participant based on the hierarchy data,
identify an acceptable range of dates over which forecasts generated from the forecast series cover,
identify members of the organization to be included in the forecasts generated from the forecast series, the members derived from the hierarchy,
identify forecast data to be automatically analyzed to generate the forecasts from the forecast series,
identify a visibility mode for the forecasts generated from the forecast series,
are employed to generate a forecast series comprising the identity of the hierarchy data, the identity of the current forecast participant, the identity of members of the organization who are subordinate to the current forecast participant, the identity of the acceptable range of dates, the identity of the members of the organization to be included in the forecast, the identity of the forecast data to be automatically analyzed, and the identity of the visibility mode, and
are stored together with the forecast series, wherein the stored forecast series is accessible for use in generation of forecasts upon request, and
the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy that is less than or equal to n levels below a management level occupied by the manager, and there is at least one level in the hierarchy that is below the last level included in the search scope, an opportunity and revenue scheduling creation set of instructions to identify forecast data corresponding to the members of the organization, a forecast creation set of instructions that define attributes of a particular forecasts, wherein the set attributes fall within the set of parameters comprised in the forecast series, the forecast creation set of instructions comprising instructions to
generate forecasts for one or more members of the organization who are identified as being subordinate to the current forecast participant, using the forecast series, and
present forecast data to the current forecast participant, and said processer configured to generate the particular forecast using the forecast series.

7. The computer system of claim 6, wherein
the current forecast participant is a manager whose forecast is determined, at least in part, on forecasts that are submitted by one or more selected members of the organization who are subordinate to the manager, and
the forecast creation set of instructions further comprises instructions to
automatically generate a forecast for any member among said one or more selected members who has yet to submit a forecast, and generate a forecast for the manager based on a combination of forecasts submitted by said one or more selected members and any forecast that is automatically generated.

8. The computer system of claim 7 wherein the forecast creation set of instructions further comprises instructions to automatically calculate forecasts for said one or more selected members of the organization who are subordinate to the manager and have not submitted their forecast in a recursive manner from lower levels to higher levels in the organization's hierarchy, wherein
the manager occupies at least a second level of management in the organization's hierarchy.

9. The computer system of claim 6, wherein
the forecast series further comprises a field indicating whether the forecast series is available for forecasting purposes.

10. A system comprising:
a processor;
a memory, coupled to the processor, and storing instructions executable on the processor,
the instructions comprising
a forecast series creation set of instructions, wherein
a forecast series associated with the forecast series creation set of instructions comprises a set of parameters that define attributes of forecasts that are created from the forecast series, wherein the set of parameters
identify hierarchy data defining a hierarchy structure of an organization, including data identifying a hierarchical position of members of the organization, wherein the hierarchy structure comprises a plurality of management levels,
identify rules that specify forecast data that are visible to each member of the organization,
identify an acceptable range of dates over which forecasts generated from the forecast series cover,
identify members of the organization to be included in the forecast, the members derived from the hierarchy,
identify forecast data to be automatically analyzed to generate forecasts from the forecast series,
identify a visibility mode for the forecasts generated from the forecast series,
are employed to generate a forecast series comprising the identity of the hierarchy data, the identity of the rules, the identity of the acceptable range of dates, the identity of the members of the organization to be included in the forecast, the identity of the forecast data to be automatically analyzed, and the identity of the visibility mode, and
are stored together with the forecast series, wherein the stored forecast series is accessible for use in generation of forecasts upon request, and
the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy that is less than or equal to n levels below a management level occupied by the manager, and there is at least one level in the hierarchy structure that is below the last level included in the search scope,
an opportunity and revenue scheduling creation set of instructions to send data comprising a set of interactive HTML components via a computer network to a client, a portion of which enable forecast data corresponding to members of the organization to be entered via the client,
a forecast creation set of instructions that define attributes of a particular forecasts, wherein the set attributes fall within the set of parameters comprised in the forecast series to
generate the particular forecast for members of the organization using the forecast series, wherein each forecast is generated based on forecast data that are visible to corresponding members according to the visibility rules, and
send forecast data corresponding to the forecast to the client to be viewed by a user through use of the set of interactive HTML components, and
said processer configured to generate the particular forecast using the forecast series.

11. The system of claim 10, wherein
the forecast series creation set of instructions further comprises instructions to
define visibility rules that specify the forecast data that are visible to each management level of the organization, and
include the visibility rules in the forecast series, and
the forecast creation set of instructions further comprises instructions to generate a
forecast for any management level of the organization, wherein
each forecast that is generated is based on forecast data that are visible to the management level for which that forecast corresponds as specified by the visibility rules.

12. The system of claim 10, wherein the forecast creation set of instructions further comprises instructions to:
enable a member of the organization to submit a forecast to a superior; and
prevent the member from modifying the forecast after it has been submitted.

13. The system of claim 12 wherein the forecast creation set of instructions further comprises instructions to enable one or more of the superior to which the forecast was submitted and a system administrator to unsubmit the forecast such that the member who submitted that forecast is enabled to modify the forecast.

14. The system of claim 10, wherein
the forecast creation set of instructions further comprises instructions to send data to the client, and
the set of interactive HTML components are configured to present the forecast data in a graphical format that enables a member to compare forecast data corresponding to related forecasts over time that are specified to be visible to that member.

15. The system of claim 10, wherein
the forecast series further comprises a field indicating whether the forecast series is available for forecasting purposes.

16. A system comprising:
a processor;
a memory, coupled to the processor, and storing instructions executable on the processor,
the instructions comprising
a forecast series creation set of instructions, wherein
a forecast series associated with the forecast series creation set of instructions comprises a set of parameters that define attributes of forecasts that are created from the forecast series, wherein the set of parameters identify hierarchy data defining members of an organization and a hierarchical position held by each member to be stored in a database in a hierarchy comprising a plurality of management levels, determine an identity of a current forecast participant who is a member of the organization and using the client, identify members of the organization who are subordinate to the current forecast participant based on the hierarchy data, identify an acceptable range of dates over which forecasts generated from the forecast series cover, identify members of the organization to be included in the forecast, the members derived from the hierarchy, identify forecast data to be automatically analyzed to generate the forecasts from the forecast series, identify a visibility mode for the forecasts generated from the forecast series, are employed to generate a forecast series comprising the identity of the current forecast participant, the identity of members of the organization who are subordinate to the current forecast participant, the identity of the acceptable range of dates, the identity of the members of the organization to be included in the forecast, the identity of the forecast data to be automatically analyzed, and the identity of the visibility mode, and are stored together with the forecast series, wherein the stored forecast series is accessible for use in generation of forecasts upon request, and the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy that is less than or equal to n levels below a management level occupied by the manager, and there is at least one level in the hierarchy that is below the last level included in the search scope, an opportunity and revenue scheduling creation set of instructions to send data corresponding to a set of interactive HTML components via a computer network to a client that enable forecast data corresponding to members of the organization to be entered by a user of the client, a forecast creation set of instructions that define attributes of a particular forecasts, wherein the set attributes fall within the set of parameters comprised in the forecast series to generate forecasts, using the forecast series, for one or more members of the organization who are identified as being subordinate to the current forecast participant, and send forecast data to the client to be displayed to the user via the set of interactive HTML components, and said processor configured to generate the particular forecast using the forecast series.

17. The system of claim 16, wherein the current forecast participant is a manager whose forecast is determined, at least in part, on forecasts that are submitted by one or more selected members of the organization who are subordinate to the manager, and the forecast creation set of instructions further comprises instructions to automatically generate a forecast for any member among said one or more selected members who has yet to submit a forecast, and generate a forecast for the manager based on a combination of forecasts submitted by said one or more selected members and any forecast that is automatically generated.

18. The system of claim 17, wherein the forecast creation set of instructions further comprises instructions to automatically calculate forecasts for said one or more selected members of the organization who are subordinate to the manager and have not submitted their forecast in a recursive manner from lower levels to higher levels in the organization's hierarchy, wherein the manager occupies at least a second level of management in the organization's hierarchy.

19. The system of claim 16, wherein the forecast series further comprises a field indicating whether the forecast series is available for forecasting purposes.

20. A computer implemented method comprising:

receiving an identification of hierarchy data defining a hierarchy structure of an organization, including data identifying a hierarchical position of each member of the organization, wherein the hierarchy structure comprises a plurality of management levels;

receiving an identification of an acceptable range of dates over which forecasts generated from a forecast series cover;

receiving an identification of members of the organization to be included in the forecasts generated from the forecast series, the members derived from the hierarchy;

receiving an identification of forecast data to be automatically analyzed to generate the forecasts from the forecast series;

receiving an identification of a visibility mode for the forecasts generated from the forecast series;

generating the forecast series comprising the identity of the hierarchy data, the identity of the date and the period of time, the identity of the members of the organization to be included in the forecast, the identity of the forecast data to be automatically analyzed, and the identity of the visibility mode, wherein the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy structure that is less than or equal to n levels below a management level occupied by the manager, there is at least one level in the hierarchy structure that is below the last level included in the search scope, and said generating the forecast series is performed using a first computer processor;

storing the forecast series, wherein the stored forecast series is accessible for use in generation of a particular forecast upon request, and said storing is performed using a memory coupled to the first computer processor; and generating the particular forecast using the forecast series wherein said generating the particular forecast is performed using a second computer processor.

21. The computer implemented method of claim 20, wherein the hierarchy structure comprises a plurality of management levels and further comprising:

receiving a definition of the visibility rules; and generating a forecast for any management level of the organization using the forecast series, wherein each forecast that is generated is based on forecast data that are visible to the management level for which that forecast corresponds as specified by the visibility rules, wherein said generating the forecast is performed using a third computer processor.

22. The computer implemented method of claim 20, further comprising presenting the forecast in a graphical format that enables a member to compare forecast data corresponding to related forecasts over time that are specified to be visible to that member, wherein said presenting the forecast in a graphical format is performed using a display coupled to a third computer processor.

23. The computer implemented method of claim 20, wherein the forecast series further comprises a field indicating whether the forecast series is available for forecasting purposes.

24. A machine-readable media on which a plurality of machine-executable instructions are stored that when executed by a machine generates forecast information corresponding to an organization by performing the operations of:

identifying hierarchy data defining a hierarchy structure of an organization, including data identifying a hierarchical position of each member of the organization, wherein the hierarchy structure comprises a plurality of management levels;

identifying an acceptable range of dates over which forecasts generated from a forecast series cover;

identifying members of the organization to be included in the forecasts generated from the forecast series, the members derived from the hierarchy;

identifying forecast data to be automatically analyzed to generate the forecasts from the forecast series;

identifying a visibility mode for the forecasts generated from the forecast series;

generating the forecast series comprising the identity of the hierarchy data, the identity of the date and the period of time, the identity of the members of the organization to be included in the forecast, the identity of the forecast data to be automatically analyzed, and the identity of the visibility mode, wherein the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy structure that is less than or equal to n levels below a management level occupied by the manager, and there is at least one level in the hierarchy structure that is below the last level included in the search scope;

storing the forecast series, wherein the stored forecast series is accessible for use in generation of a particular forecast upon request; and generating the particular forecast using the forecast series.

25. The machine-readable media of claim 24, wherein the forecast series further comprises a field indicating whether the forecast series is available for forecasting purposes.

26. A computer implemented method comprising:

receiving an identification of hierarchy data defining a hierarchy structure of an organization, wherein the hierarchy data comprises a hierarchical position of each member of the organization, and the hierarchy structure comprises a plurality of management levels;

receiving an identification of an acceptable range of dates over which forecasts generated from a forecast series cover;

receiving an identification of members of the organization to be included in the forecasts generated from the forecast series, the members derived from the hierarchy;

receiving an identification of forecast data to be automatically analyzed to generate the forecasts generated from the forecast series;

generating a forecast series comprising the identity of the hierarchy data, the identity of the acceptable range of dates, the identity of the members of the organization to be included in the forecast, and the identity of the forecast data to be automatically analyzed, wherein the forecast series further comprises visibility rules, including a maximum hierarchy depth search value n defining a search scope such that a forecast generated for a manager is generated from the manager's own forecast data and from forecast data corresponding to members of the organization who are defined to be both subordinate to the manager and occupy a management level in the hierarchy structure that is less than or equal to n levels below a management level occupied by the manager, there is at least one level in the hierarchy structure that is below the last level included in the search scope;

said generating is performed using a first computer processor;

storing the forecast series, wherein the stored forecast series is accessible for use in generation of a particular forecast upon request, and said storing is performed using a memory coupled to the first computer processor; and generating the particular forecast using the forecast series, wherein said generating the particular forecast is performed using a second computer processor.

27. The computer implemented method of claim 26, wherein the forecast series further comprises a field indicating whether the forecast series is available for forecasting purposes.

* * * * *

UNITED STATES PATENT AND TRADEMARK OFFICE
CERTIFICATE OF CORRECTION

| | | |
|---|---|---|
| PATENT NO. | : 7,761,324 B2 | |
| APPLICATION NO. | : 10/008254 | |
| DATED | : July 20, 2010 | |
| INVENTOR(S) | : Prasanna Amerasinghe et al. | |

It is certified that error appears in the above-identified patent and that said Letters Patent is hereby corrected as shown below:

In column 6, line 53, delete ""Sales Rep,""Manager,"" and insert -- "Sales Rep," "Manager," --, therefor.

In column 22, line 56, in claim 1, after "for" delete "the".

In column 22, line 58, in claim 1, delete "generated" and insert -- generate --, therefor.

In column 24, line 46, in claim 6, delete "forecasts," and insert -- forecast, --, therefor.

In column 24, line 46, in claim 6, after "the" delete "set".

In column 24, line 56, in claim 6, delete "processer" and insert -- processor --, therefor.

In column 25, line 44, in claim 10, after "for" delete "the".

In column 25, line 63, in claim 10, delete "hierarchy" and insert -- hierarchy structure --, therefor.

In column 26, line 8, in claim 10, delete "forecasts," and insert -- forecast, --, therefor.

In column 26, line 8, in claim 10, after "the" delete "set".

In column 26, line 19, in claim 10, delete "processer" and insert -- processor --, therefor.

In column 27, line 30, in claim 16, after "of" delete "the".

In column 27, line 32, in claim 16, after "of" delete "the".

In column 27, line 56, in claim 16, delete "forecasts," and insert -- forecast, --, therefor.

Signed and Sealed this
Twenty-sixth Day of April, 2011

David J. Kappos
*Director of the United States Patent and Trademark Office*

CERTIFICATE OF CORRECTION (continued)
U.S. Pat. No. 7,761,324 B2

In column 27, line 56, in claim 16, after "the" delete "set".

In column 27, line 66, in claim 16, delete "processer" and insert -- processor --, therefor.

In column 30, line 44, in claim 26, delete "scope;" and insert -- scope, and --, therefor.